(12) United States Patent
Li et al.

(10) Patent No.: US 10,855,357 B2
(45) Date of Patent: Dec. 1, 2020

(54) COMMUNICATION METHOD, BASE STATION, AND TERMINAL DEVICE

(71) Applicant: HUAWEI TECHNOLOGIES CO., LTD., Guangdong (CN)

(72) Inventors: Xueru Li, Beijing (CN); Kunpeng Liu, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/460,662

(22) Filed: Jul. 2, 2019

(65) Prior Publication Data

US 2019/0326974 A1 Oct. 24, 2019

Related U.S. Application Data

(63) Continuation of application No. PCT/CN2018/070080, filed on Jan. 3, 2018.

(30) Foreign Application Priority Data

Jan. 3, 2017 (CN) .......................... 2017 1 0002771
Feb. 14, 2017 (CN) .......................... 2017 1 0079315

(51) Int. Cl.
*H04B 7/02* (2018.01)
*H04B 7/06* (2006.01)
*H04B 7/0456* (2017.01)

(52) U.S. Cl.
CPC ......... *H04B 7/0626* (2013.01); *H04B 7/0478* (2013.01); *H04B 7/0639* (2013.01); *H04B 7/0695* (2013.01)

(58) Field of Classification Search
CPC .. H04B 7/0626; H04B 7/0478; H04B 7/0639; H04B 7/0695; H04B 7/0456; H04B 5/0048; H04B 7/0617; H04L 5/0048
See application file for complete search history.

(56) References Cited

U.S. PATENT DOCUMENTS

2014/0241274 A1 8/2014 Lee et al.
2015/0280801 A1 10/2015 Xin et al.
(Continued)

FOREIGN PATENT DOCUMENTS

CN 102231661 A 11/2011
CN 103746779 A 4/2014
(Continued)

OTHER PUBLICATIONS

Samsung,"Rank 1 linear combination codebook and simulation results",3GPP TSG RAN WGI Meeting #87 R1-1612416,Reno, USA, Nov. 14-18, 2016, 6 pages.
(Continued)

*Primary Examiner* — Tesfaldet Bocure
(74) *Attorney, Agent, or Firm* — Fish & Richardson P.C.

(57) ABSTRACT

Embodiments of the present invention provide a communication method, a base station, and a terminal device. The method includes: transmitting, by a base station, signals to a terminal device by using n port groups, where each of the n port groups includes at least two ports; and receiving, by the base station, s first linear combination coefficient groups transmitted by the terminal device, where each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups. This can improve channel feedback precision of the terminal device, and further help improve performance of transmission between the base station and the terminal device.

12 Claims, 6 Drawing Sheets

(56) References Cited

U.S. PATENT DOCUMENTS

| | | | |
|---|---|---|---|
| 2016/0088613 | A1 | 3/2016 | Li et al. |
| 2016/0119097 | A1* | 4/2016 | Nam ............... H04L 5/0023 370/329 |
| 2016/0156397 | A1 | 6/2016 | Onggosanusi et al. |
| 2017/0085304 | A1 | 3/2017 | Zhao et al. |
| 2017/0195019 | A1 | 7/2017 | Shang |
| 2018/0069680 | A1 | 3/2018 | Lee et al. |
| 2019/0007107 | A1* | 1/2019 | Kim ............... H04L 5/0053 |
| 2020/0036418 | A1* | 1/2020 | Faxer ............... H04B 7/063 |

FOREIGN PATENT DOCUMENTS

| | | | |
|---|---|---|---|
| CN | 104205738 | A | 12/2014 |
| CN | 104396296 | A | 3/2015 |
| CN | 105052049 | A | 11/2015 |
| CN | 105099604 | A | 11/2015 |
| CN | 105612707 | A | 5/2016 |
| CN | 105959046 | A | 9/2016 |
| CN | 106233640 | A | 12/2016 |

OTHER PUBLICATIONS

Qualcomm Incorporated,"Discussion on advanced CSI reporting for eFD-MIMO",3GPP TSG-RAN WGI #87 R1-1611596,Nov. 14-18, 2016, Reno, USA, 6 pages.

PCT International Search Report and Written Opinion issued in International Application No. PCT/CN2018/070080, dated Mar. 28, 2018, 15 pages (With English Translation).

Office Action issued in Chinese Application No. 201880003632.X dated Dec. 23, 2019, 5 pages.

R1-154378—ZTE, "Discussion on CSI Process and CSI-RS Resource Definitions," 3GPP TSG RAN WG1 Meeting #82, Beijing, China, Aug. 24-28, 2015, 6 pages.

Search Report issued in Chinese Application No. 201880003632.X dated Dec. 11, 2019, 3 pages.

Intel Corporation, "Discussion on NR codebook design",3GPP TSG-RAN WG1 #87 R1-1611983, Reno, USA Nov. 14-18, 2016,10 pages.

Extended European Search Report issued in European Application No. 18736205.8 dated Oct. 11, 2019, 11 pages.

* cited by examiner

COMMUNICATION METHOD, BASE STATION, AND TERMINAL DEVICE

CROSS-REFERENCE TO RELATED APPLICATIONS

This application is a continuation of International Application No. PCT/CN2018/070080, filed on Jan. 3, 2018, which claims priority to Chinese Patent Application No. 201710079315.3, filed on Feb. 14, 2017 and priority to Chinese Patent Application No. 201710002771.8, filed on Jan. 3, 2017, The disclosures of the aforementioned applications are hereby incorporated by reference in their entireties.

TECHNICAL FIELD

Embodiments of the present invention relate to the communications field, and more specifically, to a communication method, a base station, and a terminal device.

BACKGROUND

In a multiple input multiple output (Multiple Input Multiple Output, MIMO) system, a base station may select an appropriate spatial precoding matrix for data by using accurate channel state information (Channel state information, CSI), to increase received signal power of user equipment (User Equipment, UE), reduce interference between different UEs, and simultaneously transmit a plurality of data streams to the UE, thereby increasing a data transmission rate greatly.

Specifically, in the prior art, the base station transmits, by using a plurality of ports, a plurality of measurement reference signals on which precoding processing has been performed. The UE measures the plurality of received measurement reference signals, calculates channel coefficients of the signals from the ports to the UE, selects, from the channel coefficients, a channel coefficient (for example, a channel coefficient with highest power) that best matches a current actual channel condition, and feeds back, to the base station, a number of a port corresponding to the channel coefficient. The base station may determine, based on the number fed back by the UE, a precoding matrix for transmitting subsequent data.

However, because a quantity of ports is limited, downlink channels reflected by a plurality of channel coefficients measured by the UE are also limited. If none of the plurality of channel coefficients measured by the UE matches the current actual channel condition well, channel feedback precision is relatively low, and further, transmission performance is affected.

SUMMARY

Embodiments of the present invention provide a communication method, a base station, and a terminal device to improve channel feedback precision.

According to a first aspect, a communication method is provided and includes:

transmitting, by a base station, signals to a terminal device by using n port groups, where each of the n port groups includes at least two ports, and n is a positive integer greater than or equal to 2; and receiving, by the base station, s first linear combination coefficient groups transmitted by the terminal device, where each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups, s is a positive integer less than or equal to n, and s is a positive integer greater than or equal to 2.

In this embodiment of the present invention, the s first linear combination coefficient groups are transmitted to the base station. This can improve channel feedback precision of the terminal device, and further help improve performance of transmission between the base station and the terminal device.

Optionally, the signals transmitted by the base station by using the n port groups are used to measure channel coefficients of a plurality of channels from the n port groups to the terminal device. For example, the signals are reference signals.

In some possible implementations, the first precoding matrix is obtained based on the s first linear combination coefficient groups and s base vector groups, and each base vector group includes base vectors of one of the s port groups.

Optionally, the s first linear combination coefficient groups are used to perform linear combination on the s base vector groups to obtain the first precoding matrix.

In some possible implementations, the method further includes:

receiving, by the base station, base vector information and s second linear combination coefficients transmitted by the terminal device, where the base vector information is used to indicate s base vector groups, each base vector group includes base vectors of one of the s port groups, and at least one base vector group includes at least two base vectors; and the first precoding matrix is obtained through calculation based on the s base vector groups, the s first linear combination coefficient groups, and the s second linear combination coefficients.

Optionally, each first linear combination coefficient group is used to perform linear combination on each base vector group to generate a second precoding matrix of each port group, and the s second linear combination coefficients are used to perform linear combination on s second precoding matrices of the s port groups to obtain the first precoding matrix.

In some possible implementations, before the receiving, by the base station, s first linear combination coefficient groups transmitted by the terminal device, the method further includes:

transmitting, by the base station, first configuration information to the terminal device; or receiving, by the base station, first configuration information transmitted by the terminal device; where the first configuration information is used to indicate at least one of a frequency domain granularity of a phase and a frequency domain granularity of an amplitude of each second linear combination coefficient, and a quantity of quantized bits of the phase and a quantity of quantized bits of the amplitude of each second linear combination coefficient.

Optionally, the frequency domain granularity of the phase and the frequency domain granularity of the amplitude of each second linear combination coefficient include a frequency domain granularity of a phase and a frequency domain granularity of an amplitude of each second linear combination coefficient transmitted by the terminal device.

The frequency domain granularity may include a subband frequency domain granularity, a wideband frequency domain granularity, a partial bandwidth frequency domain granularity, or another frequency domain granularity. This is not limited in this embodiment of the present invention.

In some possible implementations, before the receiving, by the base station, s first linear combination coefficient groups transmitted by the terminal device, the method further includes:

transmitting, by the base station, second configuration information of each of the n port groups to the terminal device; or receiving, by the base station, second configuration information of each of the n port groups, transmitted by the terminal device; where the second configuration information is used to indicate a base vector group of each port group.

Optionally, the base station or the terminal device may separately configure the second configuration information of each of the n port groups. For example, second configuration information of at least two of the n port groups is different. However, this is not limited in this embodiment of the present invention. All the second configuration information of the n port groups may be the same. For example, the base station or the terminal device may configure the second configuration information of the n port groups in a unified manner. Alternatively, the base station or the terminal device may separately configure the second configuration information of the n port groups, and all the second configuration information of then port groups may be the same.

Properly configuring a size of each base vector group can further reduce feedback overheads of the terminal device.

In some possible implementations, before the receiving, by the base station, s first linear combination coefficient groups transmitted by the terminal device, the method further includes:

transmitting, by the base station, third configuration information to the terminal device; or receiving, by the base station, third configuration information transmitted by the terminal device; where the third configuration information is used to indicate a quantity s of port groups selected by the terminal device from the n port groups.

In some possible implementations, before the receiving, by the base station, s first linear combination coefficient groups transmitted by the terminal device, the method further includes:

transmitting, by the base station, fourth configuration information of each of the n port groups to the terminal device; or receiving, by the base station, fourth configuration information of each of the n port groups, transmitted by the terminal device; where the fourth configuration information is used to indicate at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group.

Optionally, the frequency domain granularity of the phases and the frequency domain granularity of the amplitudes of the first linear combination coefficients of each port group include a frequency domain granularity of phases and a frequency domain granularity of amplitudes of first linear combination coefficients of each port group, transmitted by the terminal device. The frequency domain granularity may include a subband frequency domain granularity, a wideband frequency domain granularity, a partial bandwidth frequency domain granularity, or another frequency domain granularity. This is not limited in this embodiment of the present invention.

Optionally, the base station or the terminal device may separately configure the fourth configuration information of each of the n port groups. For example, fourth configuration information of at least two of the n port groups is different. Separately configuring fourth configuration information of different port groups can reduce feedback overheads of the terminal device.

However, this is not limited in this embodiment of the present invention. All the fourth configuration information of the n port groups may be the same. For example, the base station or the terminal device may configure the fourth configuration information of the n port groups in a unified manner. Alternatively, the base station or the terminal device may separately configure the fourth configuration information of the n port groups, and all the fourth configuration information of the n port groups may be the same.

In some possible implementations, before the receiving, by the base station, s first linear combination coefficient groups transmitted by the terminal device, the method further includes:

transmitting, by the base station, grouping information of the n port groups to the terminal device.

Optionally, the grouping information is used to indicate a quantity of ports and/or grouping of ports.

In some possible implementations, the s first linear combination coefficient groups are used to perform linear combination on the s base vector groups to obtain the first precoding matrix.

Before the receiving, by the base station, s first linear combination coefficient groups transmitted by the terminal device, the method further includes:

transmitting, by the base station, fifth configuration information to the terminal device; or receiving, by the base station, fifth configuration information transmitted by the terminal device; where the fifth configuration information is used to indicate a quantity of ports selected by the terminal device from each port group.

It should be noted that, the base station and the terminal device may further prestore a quantity of ports in each port group. Therefore, the base station does not need to transmit the fifth configuration information to the terminal device, and does not need to receive the fifth configuration information transmitted by the terminal device either.

According to a second aspect, a communication method is provided and includes:

receiving, by a terminal device, signals transmitted by a base station by using n port groups, where each of the n port groups includes at least two ports, and n is a positive integer greater than or equal to 2; and transmitting, by the terminal device, s first linear combination coefficient groups to the base station, where each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups, s is a positive integer less than or equal to n, and s is a positive integer greater than or equal to 2.

In this embodiment of the present invention, the s first linear combination coefficient groups are transmitted to the base station. This can improve channel feedback precision of the terminal device, and further help improve performance of transmission between the base station and the terminal device.

Optionally, the signals transmitted by the base station by using the n port groups are used to measure channel coefficients of a plurality of channels from the n port groups to the terminal device. For example, the signals are reference signals.

In some possible implementations, the first precoding matrix is obtained based on the s first linear combination coefficient groups and s base vector groups, and each base vector group includes base vectors of one of the s port groups.

Optionally, the s first linear combination coefficient groups are used to perform linear combination on the s base vector groups to obtain the first precoding matrix.

In some possible implementations, the method further includes:

transmitting, by the terminal device, base vector information and s second linear combination coefficients to the base station, where the base vector information is used to indicate s base vector groups, each base vector group includes base vectors of one of the s port groups, and at least one base vector group includes at least two base vectors; and the first precoding matrix is obtained through calculation based on the s base vector groups, the s first linear combination coefficient groups, and the s second linear combination coefficients.

Optionally, each first linear combination coefficient group is used to perform linear combination on each base vector group to generate a second precoding matrix of each port group, and the s second linear combination coefficients are used to perform linear combination on s precoding matrices of the s port groups to obtain the first precoding matrix.

In some possible implementations, before the transmitting, by the terminal device, s first linear combination coefficient groups to the base station, the method further includes:

receiving, by the terminal device, first configuration information transmitted by the base station; or transmitting, by the terminal device, first configuration information to the base station; where the first configuration information is used to indicate at least one of a frequency domain granularity of a phase and a frequency domain granularity of an amplitude of each second linear combination coefficient, and a quantity of quantized bits of the phase and a quantity of quantized bits of the amplitude of each second linear combination coefficient.

Optionally, the frequency domain granularity of the phase and the frequency domain granularity of the amplitude of each second linear combination coefficient include a frequency domain granularity of a phase and a frequency domain granularity of an amplitude of each second linear combination coefficient transmitted by the terminal device. The frequency domain granularity may include a subband frequency domain granularity, a wideband frequency domain granularity, a partial bandwidth frequency domain granularity, or another frequency domain granularity. This is not limited in this embodiment of the present invention.

In some possible implementations, before the transmitting, by the terminal device, s first linear combination coefficient groups to the base station, the method further includes:

receiving, by the terminal device, second configuration information corresponding to each of the n port groups, transmitted by the base station; or transmitting, by the terminal device, second configuration information corresponding to each of the n port groups to the base station; where the second configuration information is used to indicate a base vector group corresponding to each port group.

Optionally, the base station or the terminal device may separately configure the second configuration information of each of the n port groups. For example, second configuration information of at least two of the n port groups is different. However, this is not limited in this embodiment of the present invention. All the second configuration information of the n port groups may be the same. For example, the base station or the terminal device may configure the second configuration information of the n port groups in a unified manner. Alternatively, the base station or the terminal device may separately configure the second configuration information of the n port groups, and all the second configuration information of the n port groups may be the same.

Properly configuring a size of each base vector group can further reduce feedback overheads of the terminal device.

In some possible implementations, before the transmitting, by the terminal device, s first linear combination coefficient groups to the base station, the method further includes:

receiving, by the terminal device, third configuration information transmitted by the base station; or transmitting, by the terminal device, third configuration information to the base station; where the third configuration information is used to indicate a quantity s of port groups selected by the terminal device from the n port groups.

In some possible implementations, before the transmitting, by the terminal device, s first linear combination coefficient groups to the base station, the method further includes:

receiving, by the terminal device, fourth configuration information of each of the n port groups, transmitted by the base station; or transmitting, by the terminal device, fourth configuration information of each of the n port groups to the base station; where the fourth configuration information is used to indicate at least one of a frequency domain granularity of phases and a frequency domain granularity of amplitudes of the first linear combination coefficients of each port group, and a quantity of quantized bits of the phases and a quantity of quantized bits of the amplitudes of the first linear combination coefficients of each port group.

Optionally, the frequency domain granularity of the phases and the frequency domain granularity of the amplitudes of the first linear combination coefficients of each port group include a frequency domain granularity of phases and a frequency domain granularity of amplitudes of first linear combination coefficients of each port group, transmitted by the terminal device. The frequency domain granularity may include a subband frequency domain granularity, a wideband frequency domain granularity, a partial bandwidth frequency domain granularity, or another frequency domain granularity. This is not limited in this embodiment of the present invention.

Optionally, the base station or the terminal device may separately configure the fourth configuration information of each of the n port groups. For example, fourth configuration information of at least two of the n port groups is different.

Separately configuring fourth configuration information of different ports can reduce feedback overheads of the terminal device.

However, this is not limited in this embodiment of the present invention. All the fourth configuration information of the n port groups may be the same. For example, the base station or the terminal device may configure the fourth configuration information of the n port groups in a unified manner. Alternatively, the base station or the terminal device may separately configure the fourth configuration information of the n port groups, and all the fourth configuration information of the n port groups may be the same.

In some possible implementations, before the transmitting, by the terminal device, s first linear combination coefficient groups to the base station, the method further includes:

receiving, by the terminal device, grouping information of the n port groups that is transmitted by the base station.

Optionally, the grouping information is used to indicate a quantity of ports and/or grouping of ports.

In some possible implementations, the s first linear combination coefficient groups are used to perform linear combination on the s base vector groups to obtain the first precoding matrix.

Before the transmitting, by the terminal device, s first linear combination coefficient groups to the base station, the method further includes:

receiving, by the terminal device, fifth configuration information transmitted by the base station; or transmitting, by the terminal device, fifth configuration information to the base station; where the fifth configuration information is used to indicate a quantity of ports selected by the terminal device from each port group.

It should be noted that, the base station and the terminal device may further prestore a quantity of ports in each port group. Therefore, the base station does not need to transmit the fifth configuration information to the terminal device, and does not need to receive the fifth configuration information transmitted by the terminal device either.

According to a third aspect, a communication method is provided and includes:

receiving, by a terminal device, reference signals of n port groups, where each of the n port groups includes p ports, n is a positive integer greater than or equal to 2, and p is a positive integer greater than or equal to 1; and transmitting, by the terminal device, s first linear combination coefficient groups, base vector information, and second linear combination coefficients, where the s first linear combination coefficient groups, the base vector information, and the second linear combination coefficients are determined based on measurement results of the reference signals of then port groups, where the s first linear combination coefficient groups are first linear combination coefficients of s port groups selected from the n port groups, and are used to perform linear combination on the s port groups, where an $x_1^{th}$ port in a first port group is linearly combined with an $x_2^{th}$ port in a second port group to an $x_s^{th}$ port in an $s^{th}$ port group in the s port groups, $1 \leq x_w \leq p$, $1 \leq w \leq s$, $2 \leq s \leq n$, and $x_w$, w, and s are integers; and the base vector information and the second linear combination coefficients are determined based on the s first linear combination coefficient groups, the base vector information is used to indicate at least two base vectors, the second linear combination coefficients are used to perform linear combination on the at least two base vectors, and the s first linear combination coefficient groups, the at least two base vectors, and the second linear combination coefficients are used to determine a precoding matrix.

It should be understood that, the s first linear combination coefficient groups, the base vector information, and the second linear combination coefficients are determined by the terminal device based on the measurement results of the reference signals of the n port groups.

The s first linear combination coefficient groups are used by the terminal device or a base station to perform linear combination on the s port groups.

In this embodiment of the present invention, the s first linear combination coefficient groups, the base vector information, and the second linear combination coefficients are transmitted to the base station. This can improve channel feedback precision of the terminal device, and further help improve performance of transmission between the base station and the terminal device.

In some possible implementations, the $x_1^{th}$ port in the first port group, and the $x_2^{th}$ port in the second port group to the $x_s^{th}$ port in the 5th port group in the s port groups correspond to a same antenna.

In some possible implementations, the method further includes:

transmitting, by the terminal device, a channel quality indicator CQI, where the CQI is determined based on identifiers of ports in the s groups and a matrix W, and the matrix W satisfies the following expression:

$$W = W_3 * W_1 * W_2,$$

where $W_3$ is a matrix including the s first linear combination coefficient groups, $W_1$ is a matrix including the at least two base vectors, and $W_2$ is a matrix including the second linear combination coefficients.

In some possible implementations, the method further includes:

transmitting, by the terminal device, a CQI, where the CQI is determined based on a matrix W, and the matrix W satisfies the following expression:

$$W = W_4 * W_3 * W_1 * W_2,$$

where $W_4$ is a matrix used to indicate identifiers of ports in the s groups, $W_3$ is a matrix including the s first linear combination coefficient groups, $W_1$ is a matrix including the at least two base vectors, and $W_2$ is a matrix including the second linear combination coefficients.

In some possible implementations, $W_3$ satisfies the following expression:

$$W_3 = \begin{bmatrix} C_1 & \\ & C_2 \end{bmatrix},$$

where $$C_i = \begin{bmatrix} C_1^i \\ \vdots \\ C_s^i \end{bmatrix}, C_j^i = \begin{bmatrix} \alpha_{j,1}^i & & \\ & \ddots & \\ & & \alpha_{j,p/2}^i \end{bmatrix},$$

$C_j^i$ is a diagonal matrix whose dimensions are $$\frac{p}{2} \times \frac{p}{2},$$

$(\alpha_{j,1}, \alpha_{j,2}, \ldots, \alpha_{j,p/2}{}^1, \alpha_{j,1}{}^2, \alpha_{j,2}{}^2, \ldots, \alpha_{j,p/2}{}^2)$ is a $j^{th}$ first linear combination coefficient group in the s first linear combination coefficient groups, j=1, ..., s, and i=1 or 2; or $W_3$ satisfies the following expression:

$$W_3 = \begin{bmatrix} C_1 \\ \vdots \\ C_s \end{bmatrix},$$

where $$C_j = \begin{bmatrix} \alpha_{j,1} & & \\ & \ddots & \\ & & \alpha_{j,p} \end{bmatrix},$$

$C_j$ is a diagonal matrix whose dimensions are p×p, $(\alpha_{j,1}, \alpha_{j,2}, \ldots, \alpha_{j,p})$ is a $j^{th}$ first linear combination coefficient group in the s first linear combination coefficient groups, and j=1, ..., s.

In some possible implementations, $W_3$ satisfies the following expression:

$$W_3 = \begin{bmatrix} \alpha_1 & & & \\ & \alpha_2 & & \\ & & \ddots & \\ & & & \alpha_p \end{bmatrix},$$

where dimensions of $W_3$ are ps×p, $\alpha_w = [\alpha_{1w}, \alpha_{2w}, \ldots, \alpha_{sw}]^T$ is a vector whose dimensions are s×1, $(\Delta_{j1}, \alpha_{j2}, \ldots, \alpha_{jp})$ is a $j^{th}$ first linear combination coefficient group in the s first linear combination coefficient groups, $[\ ]^T$ represents transpose of a matrix, w=1, ..., p, and j=1, ..., s.

In some possible implementations, $W_1$ satisfies the following expression:

$$W_1 = \begin{bmatrix} b^{(1)}_{\pi_1(1)} & b^{(1)}_{\pi_1(2)} & \cdots & b^{(1)}_{\pi_1(O)} & & & & \\ & & & & b^{(2)}_{\pi_2(1)} & b^{(2)}_{\pi_2(2)} & \cdots & b^{(2)}_{\pi_2(O)} \end{bmatrix},$$

where $\pi_1(1), \ldots, \pi_1(O), \pi_2(1), \ldots, \pi_2(O) \in \{1, 2, \ldots, M\}$ are identifiers of the base vectors indicated by the base vector information, $b_j^{(1)}$, $b_j^{(2)}$ are both base vectors whose dimensions are $$\frac{p}{2} \times 1,$$

j∈{1, 2, ..., M}, O is a positive integer greater than or equal to 2, and M is a positive integer greater than or equal to 2; or $W_1$ satisfies the following expression:

$$W_1 = [b_{\pi(1)} b_{\pi(2)} \ldots b_{\pi(O)}],$$

where $\pi(1), \ldots, \pi(O) \in \{1, 2, \ldots, M\}$ are identifiers of the base vectors indicated by the base vector information, b, is a base vector whose dimensions are p×1, j∈{1, 2, ..., M}, O is a positive integer greater than or equal to 2, and M is a positive integer greater than or equal to 2.

In some possible implementations, $W_2$ satisfies the following expression:

$$W_2 = \begin{bmatrix} c_{1,1} & c_{1,2} & \cdots & c_{1,R} \\ c_{2,1} & c_{2,2} & \cdots & c_{2,R} \end{bmatrix},$$

where $c_{1,r} = [c_{1,r,1}, \ldots, c_{1,r,O}]^T$ and $c_{2,r} = [c_{2,r,1}, \ldots, c_{2,r,O}]^T$ are separately vectors whose dimensions are O×1, r is an integer greater than or equal to 1 and less than or equal to R, and R is a positive integer; or $W_2$ satisfies the following expression:

$$W_2 = [c_1 c_2 \ldots c_R],$$

where $c_r = [c_{r,1}, \ldots, c_{r,O}]^T$ is a vector whose dimensions are O×1, r is an integer greater than or equal to 1 and less than or equal to R, and R is a positive integer.

In some possible implementations, $W_4$ satisfies the following expression:

$$W_4 = \begin{bmatrix} [e^n_{g_1(1)}, e^n_{g_1(2)} \cdots, e^n_{g_1(s)}] \otimes I_{p/2} & \\ & [e^n_{g_2(1)}, e^n_{g_2(2)} \cdots, e^n_{g_2(s)}] \otimes I_{p/2} \end{bmatrix},$$

where $e_j^n$ represents a column vector whose length is n, a $j^{th}$ element in $e_j^n$ is 1, all other elements in $e_j^n$ are 0, $g_1(1), \ldots, g_1(s), g_2(1), \ldots, g_2(s) \in \{1, 2, \ldots, n\}$ represent the identifiers of the ports in the s groups, $I_m$ represents an identity matrix whose dimensions are m, and $\otimes$ represents a Kronecker product; or $W_4$ satisfies the following expression:

$$W_4 = [e_{g(1)}{}^n, e_{g(2)}{}^n \ldots, e_{g(s)}{}^n] \otimes I_p,$$

where $e_j^n$ represents a column vector whose length is n, a $j^{th}$ element in $e_j^n$ is 1, all other elements in $e_j^n$ are 0, g(1), ..., g(s) represent the identifiers of the ports in the s groups, $I_m$ represents an identity matrix whose dimensions are m, and $\otimes$ represents a Kronecker product.

In some possible implementations, $W_4$ satisfies the following expression:

$$W_4 = \begin{bmatrix} I_{p/2} \otimes [e^s_{g_1(1)}, e^s_{g_1(2)} \cdots, e^s_{g_1(s)}] & \\ & I_{p/2} \otimes [e^s_{g_2(1)}, e^s_{g_2(2)} \cdots, e^s_{g_2(s)}] \end{bmatrix},$$

where $e_j^s$ represents a column vector whose length is s, a $j^{th}$ element in $e_j^s$ is 1, all other elements in $e_j^s$ are 0, $g_1(1), \ldots, g_1(s), g_2(1), \ldots, g_2(s) \in \{1, 2, \ldots, n\}$ represent the identifiers of the ports in the s groups, $\otimes$ represents a Kronecker product, and $I_m$ represents an identity matrix whose dimensions are m; or $W_4$ satisfies the following expression:

$$W_4 = I_p \otimes [e_{g(1)}{}^s, e_{g(2)}{}^s \ldots, e_{g(s)}{}^s],$$

where $e_j^s$ represents a column vector whose length is s, a $j^{th}$ element in $e_j^s$ is 1, all other elements in $e_j^s$ are 0, g(1), ..., g(s)∈{1, 2, ..., n} represent the identifiers of the ports in the s groups, $\otimes$ represents a Kronecker product, and $I_m$ represents an identity matrix whose dimensions are m.

In some possible implementations, the method further includes:

transmitting, by the terminal device, indication information to the base station, where the indication information includes the identifiers of the ports in the s groups.

In some possible implementations, a feedback frequency domain granularity and/or a quantity of quantized bits of each of the s first linear combination coefficient groups are/is different from a feedback frequency domain granularity and/or a quantity of quantized bits of each second linear combination coefficient, and the feedback frequency domain granularity includes at least one of a wideband feedback, a subband feedback, and a partial bandwidth feedback.

In some possible implementations, the feedback frequency domain granularity of each of the s first linear combination coefficient groups is the wideband feedback, and the feedback frequency domain granularity of each second linear combination coefficient is the subband feedback or the partial bandwidth feedback.

In some possible implementations, a quantity of quantized bits of amplitudes of each of the s first linear combination coefficient groups is greater than or equal to a quantity of quantized bits of an amplitude of each second linear combination coefficient; and/or a quantity of quantized bits of phases of each of the s first linear combination coefficient groups is greater than or equal to a quantity of quantized bits of a phase of each second linear combination coefficient.

It should be understood that, the feedback frequency domain granularity and/or the quantity of quantized bits of each of the s first linear combination coefficient groups and the feedback frequency domain granularity and/or the quantity of quantized bits of each second linear combination coefficient may be predefined or may be configured by the base station.

In some possible implementations, before the transmitting, by the terminal device, s first linear combination coefficient groups, the method further includes:

receiving, by the terminal device, first configuration information; or transmitting, by the terminal device, first configuration information; where the first configuration information is used to indicate a value of s or a maximum value of s.

In some possible implementations, before the transmitting, by the terminal device, s first linear combination coefficient groups to the base station, the method further includes:

receiving, by the terminal device, second configuration information; or transmitting, by the terminal device, second configuration information; where the second configuration information is used to configure at least one of a feedback frequency domain granularity of phases and a feedback frequency domain granularity of amplitudes of the first linear combination coefficients of each port group, and a quantity of quantized bits of the phases and a quantity of quantized bits of the amplitudes of the first linear combination coefficients of each port group.

In some possible implementations, before the transmitting, by the terminal device, second linear combination coefficients to the base station, the method further includes:

receiving, by the terminal device, third configuration information; or transmitting, by the terminal device, third configuration information; where the third configuration information is used to configure at least one of a frequency domain granularity of the phase and a frequency domain granularity of the amplitude of each second linear combination coefficient, and the quantity of quantized bits of the phase and the quantity of quantized bits of the amplitude of each second linear combination coefficient.

In some possible implementations, before the transmitting, by the terminal device, s first linear combination coefficient groups, the method further includes:

receiving, by the terminal device, grouping information of the n port groups that is transmitted by the base station.

According to a fourth aspect, a communication method is provided and includes:

transmitting, by a base station, reference signals to a terminal device by using n port groups, where each of the n port groups includes p ports, n is a positive integer greater than or equal to 2, and p is a positive integer greater than or equal to 1; and receiving, by the base station, s first linear combination coefficient groups, base vector information, and second linear combination coefficients transmitted by the terminal device, where the s first linear combination coefficient groups are first linear combination coefficients of s port groups selected by the terminal device from the n port groups, and are used to perform linear combination on the s port groups, where an $x_1^{th}$ port in a first port group is linearly combined with an $x_2^{th}$ port in a second port group to an $x_s^{th}$ port in an $s^{th}$ port group in the s port groups, $1 \leq x_w \leq p$, $1 \leq w \leq s$, $2 \leq s \leq n$, and $x_w$, w, and s are integers; and the base vector information and the second linear combination coefficients are determined based on the s first linear combination coefficient groups, the base vector information is used to indicate at least two base vectors, the second linear combination coefficients are used to perform linear combination on the at least two base vectors, and the s first linear combination coefficient groups, the at least two base vectors, and the second linear combination coefficients are used to determine a precoding matrix.

It should be understood that, the s first linear combination coefficient groups, the base vector information, and the second linear combination coefficients are determined by the terminal device based on the measurement results of the reference signals of the n port groups.

The s first linear combination coefficient groups are used by the terminal device or the base station to perform linear combination on the s port groups.

In this embodiment of the present invention, the s first linear combination coefficient groups, the base vector information, and the second linear combination coefficients are transmitted to the base station. This can improve channel feedback precision of the terminal device, and further help improve performance of transmission between the base station and the terminal device.

In some possible implementations, the $x_1^{th}$ port in the first port group, and the $x_2^{th}$ port in the second port group to the $x_s^{th}$ port in the $s^{th}$ port group in the s port groups correspond to a same antenna.

In some possible implementations, the method further includes:

receiving, by the base station, a channel quality indicator CQI, where the CQI is determined based on identifiers of ports in the s groups, the s first linear combination coefficient groups, the base vector information, and the second linear combination coefficients.

In some possible implementations, the method further includes:

receiving, by the base station, indication information transmitted by the terminal device, where the indication information includes the identifiers of the ports in the s groups.

In some possible implementations, a feedback frequency domain granularity and/or a quantity of quantized bits of each of the s first linear combination coefficient groups are/is different from a feedback frequency domain granularity and/or a quantity of quantized bits of each second linear combination coefficient, and the feedback frequency domain granularity includes at least one of a wideband feedback, a subband feedback, and a partial bandwidth feedback.

In some possible implementations, the feedback frequency domain granularity of each of the s first linear combination coefficient groups is the wideband feedback, and the feedback frequency domain granularity of each second linear combination coefficient is the subband feedback or the partial bandwidth feedback.

In some possible implementations, a quantity of quantized bits of amplitudes of each of the s first linear combination coefficient groups is greater than or equal to a quantity of quantized bits of an amplitude of each second linear combination coefficient; and/or a quantity of quantized bits of phases of each of the s first linear combination coefficient groups is greater than or equal to a quantity of quantized bits of a phase of each second linear combination coefficient.

In some possible implementations, before the receiving, by the base station, s first linear combination coefficient groups transmitted by the terminal device, the method further includes:

transmitting, by the base station, first configuration information to the terminal device; or receiving, by the base station, first configuration information transmitted by the terminal device; where the first configuration information is used to indicate a value of s or a maximum value of s.

In some possible implementations, before the receiving, by the base station, s first linear combination coefficient groups transmitted by the terminal device, the method further includes:

transmitting, by the base station, second configuration information to the terminal device; or receiving, by the base station, second configuration information transmitted by the terminal device; where the second configuration information is used to configure at least one of a feedback frequency domain granularity of phases and a feedback frequency domain granularity of amplitudes of the first linear combination coefficients of each port group, and a quantity of quantized bits of the phases and a quantity of quantized bits of the amplitudes of the first linear combination coefficients of each port group.

In some possible implementations, before the receiving, by the base station, second linear combination coefficients transmitted by the terminal device, the method further includes:

transmitting, by the base station, third configuration information to the terminal device; or receiving, by the base station, third configuration information transmitted by the terminal device; where the third configuration information is used to configure at least one of a frequency domain granularity of the phase and a frequency domain granularity of the amplitude of each second linear combination coefficient, and the quantity of quantized bits of the phase and the quantity of quantized bits of the amplitude of each second linear combination coefficient.

In some possible implementations, before the receiving, by the base station, s first linear combination coefficient groups transmitted by the terminal device, the method further includes:

transmitting, by the base station, grouping information of the n port groups.

According to a fifth aspect, a base station is provided, where the base station is configured to implement the method in any one of the first aspect or the possible implementations of the first aspect.

Specifically, the base station may include units configured to perform the method in any one of the first aspect or the possible implementations of the first aspect.

According to a sixth aspect, a terminal device is provided, where the terminal device is configured to implement the method in any one of the second aspect or the possible implementations of the second aspect.

Specifically, the terminal device may include units configured to perform the method in any one of the second aspect or the possible implementations of the second aspect.

According to a seventh aspect, a terminal device is provided, where the terminal device is configured to implement the method in any one of the third aspect or the possible implementations of the third aspect.

Specifically, the terminal device may include units configured to perform the method in any one of the third aspect or the possible implementations of the third aspect.

According to an eighth aspect, a base station is provided, where the base station is configured to implement the method in any one of the fourth aspect or the possible implementations of the fourth aspect.

Specifically, the base station may include units configured to perform the method in any one of the fourth aspect or the possible implementations of the fourth aspect.

According to a ninth aspect, a base station is provided and includes a processor, a transmitter, and a memory, where the processor, the transmitter, and the memory mutually communicate by using an internal connection channel; the memory is configured to store an instruction; and the processor is configured to execute the instruction stored in the memory, where execution of the instruction stored in the memory enables the base station to perform the method in any one of the first aspect or the possible implementations of the first aspect, or execution of the instruction stored in the memory enables the base station to perform the method in any one of the fourth aspect and the possible implementations of the fourth aspect.

According to a tenth aspect, a terminal device is provided and includes a processor, a receiver, a memory, and a bus system, where the processor, the receiver, and the memory mutually communicate by using an internal connection channel; the memory is configured to store an instruction; and the processor is configured to execute the instruction stored in the memory, where execution of the instruction stored in the memory enables the terminal device to perform the method in any one of the second aspect or the possible implementations of the second aspect, or execution of the instruction stored in the memory enables the terminal device to perform the method in any one of the third aspect and the possible implementations of the third aspect.

According to an eleventh aspect, a computer-readable storage medium is provided, where the computer-readable storage medium stores a program, and the program enables a base station to perform the method in any one of the first aspect or the possible implementations of the first aspect, or the program enables the base station to perform the method in any one of the fourth aspect or the possible implementations of the fourth aspect.

According to a twelfth aspect, a computer-readable storage medium is provided, where the computer-readable storage medium stores a program, and the program enables a terminal device to perform the method in any one of the second aspect or the possible implementations of the second aspect, or the program enables the terminal device to perform the method in any one of the third aspect or the possible implementations of the third aspect.

DESCRIPTION OF EMBODIMENTS

Figure 1:
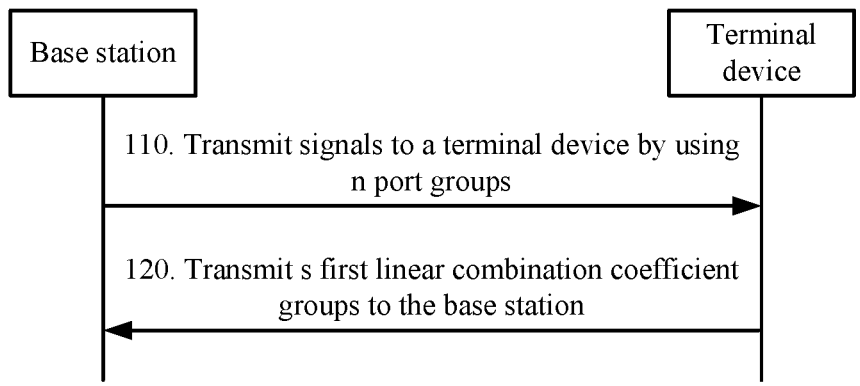
FIG. 1 is a schematic flowchart of a communication method according to an embodiment of the present invention.

The following describes technical solutions in embodiments of the present invention with reference to accompanying drawings.

It should be understood that, the technical solutions in the embodiments of the present invention may be applied to various communications systems, for example, a Wireless Fidelity (Wi-Fi) system, a Worldwide Interoperability for Microwave Access (Worldwide Interoperability for Microwave Access, WiMAX) system, a Global System for Mobile Communication (Global System for Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an Advanced Long Term Evolution (Long Term Evolution Advanced, LTE-A) system, a Universal Mobile Telecommunications System (Universal Mobile Telecommunications System, UMTS), and a 3rd Generation Partnership Project related (The 3rd Generation Partnership Project, 3GPP) related cellular system. This is not limited in the embodiments of the present invention. However, for ease of description, an LTE network is used as an example for description in the embodiments of the present invention.

The embodiments of the present invention may be used in radio networks with different standards. A radio access network may include different network elements in different systems. For example, network elements of a radio access network in a 5G network include a base station gNB; network elements of a radio access network in Long Term Evolution (Long Term Evolution, LTE) and LTE-A include an evolved NodeB (eNodeB, eNB); and network elements of a radio access network in Wideband Code Division Multiple Access (Wideband Code Division Multiple Access, WCDMA) include a radio network controller (Radio Network Controller, RNC) and a NodeB. Similarly, other radio networks such as Worldwide Interoperability for Microwave Access (Worldwide Interoperability for Microwave Access, WiMAX) may also use the solutions similar to those in the embodiments of the present invention, but only related modules in a base station system may vary. This is not limited in the embodiments of the present invention. However, for ease of description, a base station is used as an example for description in the following embodiments.

It should also be understood that in the embodiments of the present invention, the terminal device may also be referred to as user equipment (User Equipment, UE), a mobile station (Mobile Station, MS), a mobile terminal (Mobile Terminal), and the like. The terminal device may communicate with one or more core networks by using a radio access network (Radio Access Network, RAN). For example, the terminal may be a mobile phone (or referred to as a "cellular" phone), or a computer having a communication function; for example, the terminal device may also be a portable, pocket-sized, handheld, computer built-in, or in-vehicle mobile apparatus.

It should be understood that, the term "and/or" in the embodiments of the present invention describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

Terms "first" and "second" in the embodiments of the present invention are merely used for distinguishing, and do not represent a meaning of precedence or magnitude.

FIG. 1 is a schematic flowchart of a communication method 100 according to an embodiment of the present invention. As shown in FIG. 1, the method 100 includes the following content.

110. A base station transmits signals to a terminal device by using n port groups.

Each of the n port groups includes at least two ports, and n is a positive integer greater than or equal to 2.

For example, the signals transmitted by the base station to the terminal device may be used to measure a channel coefficient of a channel from each port in the n port groups to the terminal device. For example, the signals may be reference signals.

120. The terminal device transmits s first linear combination coefficient groups to the base station. Correspondingly, the base station receives the s first linear combination coefficient groups transmitted by the terminal device.

Each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups, s is a positive integer less than or equal to n, and s is a positive integer greater than or equal to 2.

Specifically, after receiving the signals transmitted by the base station by using the n port groups, the terminal device may determine channel coefficients or base vectors of each port group by measuring the received signals, determine first linear combination coefficients of each port group based on the channel coefficients or base vectors of each port group, and then transmit the s first linear combination coefficient groups of the s port groups to the base station. The s port groups selected by the terminal device may be preset, or may be configured by the base station, or may be selected by the terminal device autonomously. This is not limited in this embodiment of the present invention.

It should be understood that, after receiving the s first linear combination coefficient groups, the base station may determine the first precoding matrix based on the s first linear combination coefficient groups, and process to-be-transmitted data by using the first precoding matrix. It should also be understood that, the base station may also process the to-be-transmitted data by using another precoding matrix. This is not limited in this embodiment of the present invention.

In this embodiment of the present invention, the s first linear combination coefficient groups are transmitted to the base station. This can improve channel feedback precision of the terminal device, and further help improve performance of transmission between the base station and the terminal device.

In some embodiments, after receiving the signals transmitted by the base station, the terminal device may determine that ports on the base station side are grouped into the n port groups, so that correct channel measurements and feedbacks can be performed. For example, the base station may transmit grouping information of the n port groups to the terminal device, and the terminal device may determine the n port groups based on the grouping information received from the base station. Alternatively, the terminal device may further determine the n port groups based on prestored grouping information. Optionally, the grouping information may further indicate a quantity of ports. The grouping information may be carried in higher layer signaling (such as RRC), or may be carried in a media access control element (MAC CE) or downlink control information (DCI).

The grouping information may indicate grouping in a plurality of manners. For example, when indicating that the quantity of ports is m, the grouping information may specifically indicate how the m ports are grouped. For example, the grouping information indicates that there are m=20 ports in total, where ports {1, 2, 3, . . . , 10} are a group, and ports {11, 12, 13, . . . , 20} are a group. Alternatively, when indicating that the quantity of ports is m, the grouping information may indicate only how many groups the m ports are grouped into. Based on a predefined rule, a time-frequency sequence of signals transmitted by using the m ports may be used for grouping the m ports. The terminal device may determine grouping of the m ports based on the predefined grouping rule and a time-frequency sequence of m received signals. For example, a time-frequency sequence of signals on m=20 ports is predefined as a first port to a $20^{th}$ port; and the base station indicates, by using the grouping information, that there are m=20 ports in total, and the m=20 ports are grouped into two groups. In this case, the terminal device may determine, based on the predefined grouping rule, that 10 ports corresponding to first 10 reference signals are a group, and 10 ports corresponding to last 10 reference signals are a group.

In some embodiments, the base station may further transmit third configuration information to the terminal device, or the terminal device transmits third configuration information to the base station, where the third configuration information is used to indicate a quantity s of port groups selected by the terminal device from the n port groups. In other words, s may be configured by the base station, or may be fed back by the terminal device. It should be noted that, the base station and the terminal device may predefine a rule for selecting s port groups, for example, selecting s port groups based on a time-frequency sequence of n signal groups corresponding to the n port groups and received by the terminal device from the base station. For example, the terminal device may select first s port groups based on a predefined rule, to calculate linear combination coefficients. Alternatively, a rule for selecting s port groups based on received power of n signal groups corresponding to the n port groups and received by the terminal device from the base station may be predefined. For example, the terminal device may select s port groups with maximum signal received power.

In some embodiments, the base station may further transmit fourth configuration information of each of the n port groups to the terminal device; or the terminal device transmits fourth configuration information of each of the n port groups to the base station. The fourth configuration information is used to indicate at least one of a frequency domain granularity of phases and a frequency domain granularity of amplitudes of first linear combination coefficients of each port group that are transmitted by the terminal device, and a quantity of quantized bits of the phases and a quantity of quantized bits of the amplitudes of the first linear combination coefficients of each port group. In other words, the fourth configuration information may be configured by the base station, or may be fed back by the terminal device. The base station may perform a configuration based on historical measurement data or perform a configuration based on a feedback of the terminal device.

Optionally, the frequency domain granularity of the phases and the frequency domain granularity of the amplitudes of the first linear combination coefficients of each port group that are transmitted by the terminal device are used to indicate whether the terminal device transmits the first linear combination coefficients of each port group for each subband or transmits the first linear combination coefficients of each port group for a whole wideband or transmits the first linear combination coefficients of each port group in another frequency domain granularity.

Optionally, because power (for example, a squared modulus of a coefficient) of some of the linear combination coefficients is relatively low, the terminal device may select a plurality of linear combination coefficients with maximum power from each linear combination coefficient group, and feed back the selected linear combination coefficients to the base station. The base station may consider that default settings are used for coefficients that are not fed back. Therefore, feedback overheads of the terminal device can be reduced.

Optionally, the fourth configuration information may be further used to indicate a quantity of coefficients in each of the s first linear combination coefficient groups transmitted by the terminal device.

The base station may configure the fourth configuration information of each port group flexibly based on channel states. Optionally, fourth configuration information of at least two of the n port groups is different. However, this is not limited in this embodiment of the present invention, and fourth configuration information of then port groups may also be the same.

For example, if the base station determines that base-station-side angle extensions of uplink channels from the terminal device to a port group are relatively large, the base station may configure first linear combination coefficients of the port group that are transmitted by the terminal device to include a relatively large quantity of coefficients; or if angle extensions thereof are relatively small, the base station may configure first linear combination coefficients of the port group to include a relatively small quantity of coefficients. If received power of uplink signals received from a port group is relatively high and angle extensions thereof are relatively small, the base station may infer that downlink channels corresponding to the port group mainly include direct paths. In this case, the base station may configure first linear combination coefficients of the port to include a relatively small quantity of coefficients, and/or configure first linear combination coefficients of the port group to a relatively large quantity of quantized bits, and/or configure first linear combination coefficients of the port group to a wideband feedback. If received power of signals transmitted by a port group is relatively high and angle extensions thereof are relatively large, the base station may infer that downlink channels corresponding to the port mainly include indirect paths. In this case, the base station may configure first linear combination coefficients of the port group to include a relatively large quantity of coefficients, and/or configure first linear combination coefficients of the port group to a relatively large quantity of quantized bits, and/or configure first linear combination coefficients of the port group to a subband feedback. If received power of signals transmitted by a port group is relatively low, the base station may configure first linear combination coefficients of the port that are transmitted by the terminal device to include a relatively small quantity of coefficients.

Alternatively, the base station may make a decision based on feedback information of the terminal device. For example, the terminal device measures received power of reference signals or other signals transmitted by each port group, and transmit-end angle extensions of downlink channels from each port group to the terminal device. The terminal device feeds back, to the base station, a sorting result of the received power and a sorting result of the angle extensions of the signals correspondingly transmitted by each port group. The base station may configure at least one of a quantity of first linear combination coefficients, a quantity of quantized bits, and a frequency domain granularity based on the sorting result of the received power and the sorting result of the angle extensions of the signals. For details, refer to the foregoing related descriptions. Details are not described again herein.

Optionally, the terminal device may also report at least one of power and angle extensions of the signals transmitted by each port group, or may report other parameters. The base station makes a decision based on a parameter reported by the terminal device.

In some embodiments, the terminal device may determine at least one of a quantity of first linear combination coefficients of each group, a quantity of quantized bits of each first linear combination coefficient group, and a frequency domain granularity of each first linear combination coefficient group, and recommend configurations of each first linear combination coefficient group to the base station. For example, after the terminal device determines received power of the signals transmitted by each port group and/or angle extensions of downlink channels of each port group on the base station side, the terminal device may recommend that first linear combination coefficients of a port group corresponding to relatively high received power and/or relatively large angle extensions should include a relatively large quantity of coefficients, and that first linear combination coefficients of a port group corresponding to relatively low received power and/or relatively small angle extensions should include a relatively small quantity of coefficients. Then the base station determines the fourth configuration information based on the recommendation of the terminal device. For a specific method for determining configurations of each first linear combination coefficient group by the terminal device, refer to related content of the base station side in the foregoing descriptions. Details are not described again herein.

Therefore, by separately configuring the first linear combination coefficients of each port group, the base station can flexibly configure a quantity of coefficients included in each first linear combination coefficient group, a quantity of quantized bits of coefficients, a frequency domain granularity, and the like. This can reduce feedback overheads of the terminal device.

Figure 2:
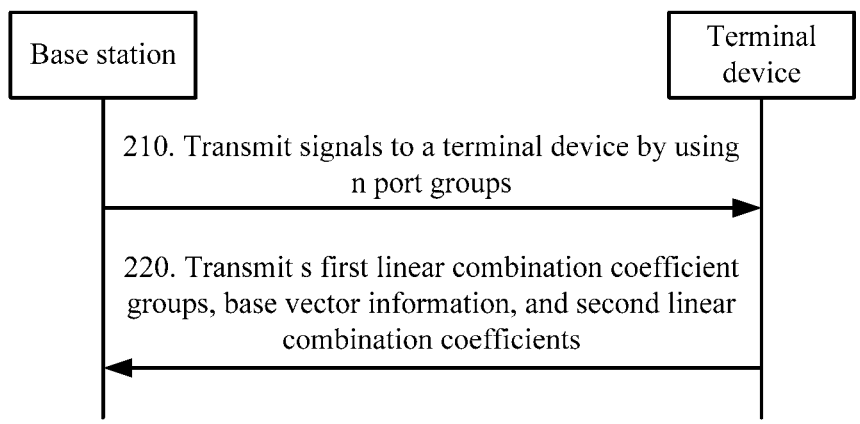
FIG. 2 is a schematic flowchart of a communication method according to another embodiment of the present invention.

FIG. 2 is a schematic flowchart of a communication method 200 according to an embodiment of the present invention. As shown in FIG. 2, the method 200 includes the following content.

210. A base station transmits reference signals to a terminal device by using n port groups.

Each of the n port groups includes at least two ports, and n is a positive integer greater than or equal to 2.

For example, the signals transmitted by the base station to the terminal device may be used to measure a channel coefficient of a channel from each port in the n port groups to the terminal device.

220. The terminal device transmits s first linear combination coefficient groups, base vector information, and second linear combination coefficients, where the s first linear combination coefficient groups, the base vector information, and the second linear combination coefficients are determined based on measurement results of the reference signals of the n port groups. Correspondingly, the base station receives the s first linear combination coefficient groups, the base vector information, and the second linear combination coefficients transmitted by the terminal device.

The s first linear combination coefficient groups are first linear combination coefficients of s port groups selected from the n port groups, and are used to perform linear combination on the s port groups, where an $x_1^{th}$ port in a first port group is linearly combined with an $x_2^{th}$ port in a second port group to an $x_s^{th}$ port in an $s^{th}$ port group in the s port groups, $1 \leq x_w \leq p$, $1 \leq w \leq s$, $2 \leq s \leq n$, and $x_w$, w, and s are integers. The base vector information and the second linear combination coefficients are determined based on the s first linear combination coefficient groups and the measurement results of the reference signals of the n port groups, the base vector information is used to indicate at least two base vectors, the second linear combination coefficients are used to perform linear combination on the at least two base vectors, and the s first linear combination coefficient groups, the at least two base vectors, and the second linear combination coefficients are used to determine a precoding matrix.

In this embodiment of the present invention, the s first linear combination coefficient groups, the base vector information, and the second linear combination coefficients are transmitted to the base station. This can improve channel feedback precision of the terminal device, and further help improve performance of transmission between the base station and the terminal device.

Optionally, the $x_1^{th}$ port in the first port group, and the $x_2^{th}$ port in the second port group to the $x_s^{th}$ port in the $s^{th}$ port group in the s port groups correspond to a same antenna. It should be noted that, values of $x_1, x_2, \ldots, x_s$ may be the same or may be different. This is not limited in this embodiment of the present invention. For example, using s=3 as an example, a first port in the first port group, a first port in the second port group, and a first port in the third port group correspond to a same antenna. Alternatively, a first port in the first port group, a third port in the second port group, and a second port in the third port group correspond to a same antenna.

Optionally, the communication method 200 may further include: the terminal device transmits a channel quality indicator CQI, where the CQI is determined based on identifiers of ports in the s groups and a matrix W, and the matrix W satisfies the following expression:

$$W=W_3*W_1*W_2,$$

where $W_3$ is a matrix including the s first linear combination coefficient groups, $W_1$ is a matrix including the at least two base vectors, and $W_2$ is a matrix including the second linear combination coefficients.

Optionally, the communication method 200 may further include:

the terminal device transmits a CQI, where the CQI is determined based on a matrix W, and the matrix W satisfies the following expression:

$$W=W_4*W_3*W_1*W_2,$$

where $W_4$ is a matrix used to indicate identifiers of ports in the s groups, $W_3$ is a matrix including the s first linear combination coefficient groups, $W_1$ is a matrix including the at least two base vectors, and $W_2$ is a matrix including the second linear combination coefficients.

For expressions of $W_1$, $W_2$, $W_3$, and $W_4$, refer to related content in the following Embodiment 3. Details are not described herein.

Optionally, the communication method 200 may further include: the terminal device transmits indication information, where the indication information includes the identifiers of the ports in the s groups. In this way, the terminal device can notify the base station of the s port groups selected from the n port groups. It should be noted that a value of s may also be configured by the base station for the terminal device.

Optionally, a feedback frequency domain granularity and/or a quantity of quantized bits of each of the s first linear combination coefficient groups are/is different from a feedback frequency domain granularity and/or a quantity of quantized bits of each second linear combination coefficient, and the feedback frequency domain granularity includes at least one of a wideband feedback, a subband feedback, and a partial bandwidth feedback.

It should be understood that, the feedback frequency domain granularity and/or the quantity of quantized bits of each of the s first linear combination coefficient groups and the feedback frequency domain granularity and/or the quantity of quantized bits of each second linear combination coefficient may be predefined or may be configured by the base station.

In some embodiments, the feedback frequency domain granularity of each of the s first linear combination coefficient groups is the wideband feedback, and the feedback frequency domain granularity of each second linear combination coefficient is the subband feedback or the partial bandwidth feedback.

In some embodiments, a quantity of quantized bits of amplitudes of each of the s first linear combination coefficient groups is greater than or equal to a quantity of quantized bits of an amplitude of each second linear combination coefficient; and/or a quantity of quantized bits of phases of each of the s first linear combination coefficient groups is greater than or equal to a quantity of quantized bits of a phase of each second linear combination coefficient.

Optionally, the base station may further configure a base vector group of each of the n port groups for the terminal device. In some embodiments, base vectors used by the terminal device to determine RI second linear combination coefficient groups and base vector information are selected from the base vector group. Because an appropriate base vector group is configured, feedback overheads of the terminal device can be reduced.

Optionally, before the terminal device determines the s first linear combination coefficient groups, the communication method 200 may further include: the base station transmits grouping information of the n port groups. Correspondingly, the terminal device receives the grouping information. The grouping information is similar to the grouping information in the communication method 100, and is not described again herein.

In this embodiment of the present invention, the s first linear combination coefficient groups, the base vector information, and the second linear combination coefficients are transmitted to the base station. This can improve channel feedback precision of the terminal device, and further help improve performance of transmission between the base station and the terminal device.

The following uses Embodiment 1 and Embodiment 2 as an example to describe the communication method 100 according to an embodiment of the present invention, and uses Embodiment 3 as an example to describe the communication method 200 according to an embodiment of the present invention.

Embodiment 1

A base station determines m ports used to transmit reference signals, where a reference signal of each port is precoded by using a precoding matrix $u_i$. It may be assumed that each precoding matrix $u_i$ is a vector with N*1 dimensions. There may be a plurality of forms of precoding vectors, for example, a discrete Fourier transform (Discrete Fourier Transform, DFT) vector. The base station determines m reference signals (such as CSI-RSs) $s_1, \ldots, s_m$, where the m CSI-RSs may be in a plurality of forms, for example, may be fixed value sequences that are orthogonal to each other, or pseudo random sequences, or in other forms. The m CSI-RSs may be predefined, and are known by the base station and a terminal device. The base station multiplies m precoding matrices separately by m reference signals to obtain m precoded reference signals: $s_1'=u_1*s_1, \ldots, s_m'=u_m*s_m$.

Figure 3:
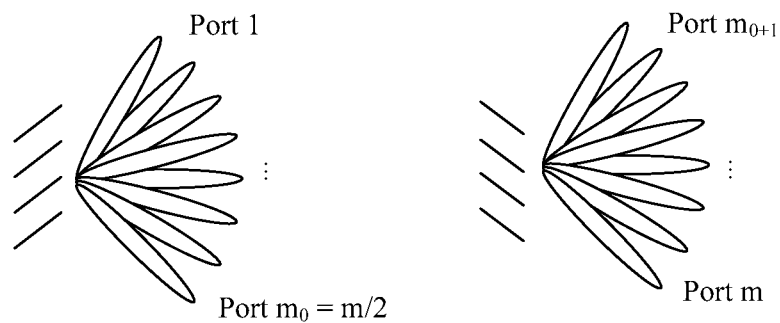
FIG. 3 is a schematic diagram of grouping according to an embodiment of the present invention.

When transmitting the m reference signals, the base station may group a plurality of ports into two port groups based on a polarization direction of an antenna, that is, n=2, as shown in FIG. 3. A first reference signal group is transmitted by $m_0=m/2$ ports in a first polarization direction, and a second reference signal group is transmitted by $m_0=m/2$ ports in a second polarization direction. The base station may further transmit grouping information of n port groups, where the grouping information is used to indicate a quantity m and grouping of ports. Correspondingly, the terminal device may receive the grouping information from the base station.

Then the base station transmits the m reference signals on the m ports. Correspondingly, the terminal device may receive the m reference signals from the base station.

For example, the terminal device may obtain channel coefficients $H_1=H*u_1, \ldots, H\_m_0=H*u\_m_0$ through estimation by measuring $m_0$ reference signals of a first port group, where H is a downlink channel matrix from the first port group to the terminal device, and dimensions are M*N. Likewise, the terminal device may measure m0 reference signals of a second port group, and estimate channel coefficients $G_1=G*u\_m_0+1 \ldots, G\_m_0=G*u\_m$, where G is a downlink channel matrix from the second port group to the terminal device, and dimensions are M*N. The channel coefficients may reflect a plurality of types of downlink channel information. For example, $u_1$ and $u_2$ in this embodiment of the present invention are two DFT vectors whose dimensions are N*1. In this case, power $|H_1|^2$ and $|H_2|^2$ of the channel coefficients $H_1$ and $H_2$ represent power of the downlink channel matrix H in spatial angle directions represented by $u_1$ and $u_2$. $|H_1|^2>|H_2|^2$ represents that on a real channel matrix H, more power is distributed in a spatial angle represented by a precoding matrix $u_1$.

However, because the quantity m of ports is limited, only power distribution of a real channel in a limited spatial angle can be obtained based on the channel coefficients of the m ports. If a spatial location of the terminal device is exactly between spatial angles represented by two precoding matrices, if the terminal device feeds back a channel coefficient of any port, a data transmission rate is impaired and/or transmission reliability is impaired.

Therefore, in this embodiment of the present invention, linear combination may be performed on channel coefficients of each port group. For example, linear combination is performed on a first channel coefficient group $H_1, \ldots, H\_m_0$. To be specific, first linear combination coefficients $(a_1, \ldots, a\_m_0)$ are selected for combining channel coefficients in the first group into a new channel coefficient $H'=a_1*H_1+ \ldots +a\_m_0*H\_m_0$. The new channel coefficient H' is a product of the downlink channel matrix H and a new precoding matrix u, where $u=a_1*u_1+ \ldots +a\_m_0*u\_m_0$. $|H'|^2$ represents power of H in a spatial angle direction represented by u. In this embodiment of the present invention, linear combination coefficients $(a_1, \ldots, a\_m_0)$ are selected properly, so that a spatial angle represented by u can exactly match a spatial angle in which the terminal device is located, and that the terminal device obtains a channel measurement result that better matches a real channel of the terminal device. Likewise, first linear combination coefficients $(b_1, \ldots, b\_m_0)$ of a second channel coefficient group $G_1, \ldots, G\_m_0$ may be obtained. Then the terminal device may transmit the s=2 first linear combination coefficient groups $(a_1, \ldots, a\_m_0)$ and $(b_1, \ldots, b\_m_0)$ to the base station.

The base station may use the s=2 first linear combination coefficient groups $(a_1, \ldots, a\_m_0)$ and $(b_1, \ldots, b\_m_0)$ received from the terminal device to form a new precoding matrix, to precode and transmit data, so that a rate of data transmission from the base station to the terminal device can be increased.

Optionally, the terminal device may select $m_1$ ports from $m_0$ ports in each of the n=2 port groups, and feed back the selected $m_1$ ports and corresponding first linear combination coefficients, where $m_1$ is a positive integer less than or equal to $m_0$ and greater than or equal to 2. For example, the terminal device may select $m_1$ ports with highest reference signal received power RSRP (reference signal receiving power) by measuring reference signals of $m_0$ ports in the first polarization direction, and select $m_1$ ports with highest RSRP by measuring reference signals of $m_0$ ports in the second polarization direction. Alternatively, by measuring other parameters, for example, reference signal received quality RSRQ (reference signal received quality), the terminal device may select $m_1$ ports with highest RSRQ separately from $m_0$ ports in the two polarization directions.

After selecting $m_1$ ports from $m_0$ ports separately in the two polarization directions, the terminal device may perform linear combination on channel coefficients of the selected ports. For example, if the terminal device selects a first port to an $m_1^{th}$ port from ports in both the first polarization direction and the second polarization direction, the terminal device may perform linear combination on a first channel coefficient group $H_1, \ldots, H\_m_1$, that is, select first linear combination coefficients $(a_1, \ldots, a\_m_1)$ for combining channel coefficients in the first group into a new channel coefficient $H'=a_1*H_1+ \ldots +a\_m_0*H\_m_1$. The new channel coefficient H' is a product of the downlink channel matrix H and a new precoding matrix u, where $u=a_1*u_1+ \ldots +a\_m_0*u\_m_1$. $|H'|^2$ represents power of H in a spatial angle direction represented by u. In this embodiment of the present invention, linear combination coefficients $(a_1, \ldots, a\_m_1)$ are selected properly, so that a spatial angle represented by u can exactly match a spatial angle in which the terminal device is located, and that the terminal device obtains a channel measurement result that better matches a real channel of the terminal device. Likewise, first linear combination coefficients $(b_1, \ldots, b\_m_1)$ of a second channel coefficient group $G_1, \ldots, G\_m_1$ may be obtained. Then the terminal device may transmit the s=2 first linear combination coefficient groups $(a_1, \ldots, a\_m_1)$ and $(b_1, \ldots, b\_m_1)$ to the base station.

The base station may use the s=2 first linear combination coefficient groups $(a_1, \ldots, a\_m_1)$ and $(b_1, \ldots, b\_m_1)$ received from the terminal device to form a new precoding matrix, to precode and transmit data, so that a rate of data transmission from the base station to the terminal device can be increased.

It should be noted that, there are a plurality of methods for calculating first linear combination coefficients $(a_1, \ldots, a\_m_0)$ and $(b_1, \ldots, b\_m_0)$ by the terminal device. This is not limited in this embodiment of the present invention. The following describes how to obtain first linear combination coefficients by using an example in which $m_0$ is equal to $m_1$.

For example, for a data transmission channel, when a rank indicator RI is equal to 1, the terminal device estimates a channel coefficient X by measuring m reference signals:

$$X=[H*u_1, \ldots, H*u\_m_0, G*u\_m_0+1, \ldots, G*u\_m].$$

Then the terminal device may obtain a right primary singular vector $x=[v_1, \ldots, v\_m_0, u_1, \ldots, u\_m_0]$ of X by performing singular value decomposition on the channel coefficient X or by using other methods. $(v_1, \ldots, v\_m_0)$ may be used as first linear combination coefficients $(a_1, \ldots,$ a_$m_0$) of the first port group, and ($u_1, \ldots, $u\_$m_0$) may be used as first linear combination coefficients ($b_1, \ldots, $b\_$m_0$) of the second port group.

Optionally, ($v_1, \ldots, $v\_$m_0$) and ($u_1, \ldots, $u\_$m_0$) may be further quantized, and the two quantized coefficient groups are used as first linear combination coefficients ($a_1, \ldots, $a\_$m_0$) of the first port group and first linear combination coefficients ($b_1, \ldots, $b\_$m_0$) of the second port group respectively.

In addition, a corresponding channel quality indicator (Channel Quality Indicator, CQI) may be further obtained after linear combination is performed on the channel coefficients by using the s=2 first linear combination coefficient groups.

It should be understood that, an objective of the foregoing obtaining method is to obtain the s=2 first linear combination coefficient groups to maximize a channel capacity of a data channel when RI=1. When RI>1, methods for calculating first linear combination coefficients of each port group are similar, and differ only in that each port group transmits RI-layer data to the terminal device simultaneously. The terminal device may determine first linear combination coefficients of data of each layer of each port group separately. For example, when RI=2, the terminal device estimates a channel coefficient X by measuring m reference signals:

$$X = [H*u_1, \ldots, H*u\_m_0, G*u\_m_0+1, \ldots, G*u\_m].$$

Then the terminal device may obtain two right primary singular vectors x1=[$v_1, \ldots, $v\_$m_0$, $u_1, \ldots, $u\_$m_0$] and x2=[$w_1, \ldots, $w\_$m_0$, $z_1, \ldots, $z\_$m_0$] of X by performing singular value decomposition on the channel coefficient X or by using other methods. ($v_1, \ldots, $v\_$m_0$) may be used as first linear combination coefficients of first-layer data of the first port group; ($u_1, \ldots, $u\_$m_0$) may be used as first linear combination coefficients of first-layer data of the second port group; ($w_1, \ldots, $w\_$m_0$) may be used as first linear combination coefficients of second-layer data of the first port group; and ($z_1, \ldots, $z\_$m_0$) may be used as first linear combination coefficients of second-layer data of the second port group.

Optionally, ($v_1, \ldots, $v\_$m_0$) and ($u_1, \ldots, $u\_$m_0$) may be further quantized, and the two quantized vectors are used as first linear combination coefficients of the first-layer data of the first port group and first linear combination coefficients of the first-layer data of the second port group respectively; ($w_1, \ldots, $w\_$m_0$) and ($z_1, \ldots, $z\_$m_0$) are quantized, and the two quantized vectors are used as first linear combination coefficients of the second-layer data of the first port group and first linear combination coefficients of the second-layer data of the second port group respectively.

The following describes how to obtain first linear combination coefficients by using an example in which $m_0$ is greater than $m_1$.

For example, for a data transmission channel, when a rank indicator RI is equal to 1, the terminal device estimates a channel coefficient X by measuring m reference signals:

$$X = [H*u_1, \ldots, H*u\_m_0, G*u\_(m_0+1), \ldots, G*u\_m].$$

Then the terminal device selects $m_1$ ports. For example, ports selected by the terminal device in both polarization directions are the first port to the math port. After selecting the $m_1$ ports, the terminal device determines a channel coefficient X':

$$X' = [H*u_1, \ldots, H*u\_m_1, G*u\_(m_0+1), \ldots, G*u\_(m_0+m_1)] \quad (1.3)$$

The terminal device may obtain a right primary singular vector x=[$v_1, \ldots, $v\_$m_1$, $u_1, \ldots, $u\_$m_1$] of X' by performing singular value decomposition on the channel coefficient X' or by using other methods. ($v_1, \ldots, $v\_$m_1$) may be used as first linear combination coefficients ($a_1, \ldots, $a\_$m_1$) of the first port group, and ($u_1, \ldots, $u\_$m_1$) may be used as first linear combination coefficients ($b_1, \ldots, $b\_$m_1$) of the second port group.

Optionally, ($v_1, \ldots, $v\_$m_1$) and ($u_1, \ldots, $u\_$m_1$) may be further quantized, and the two quantized coefficient groups are used as first linear combination coefficients ($a_1, \ldots, $a\_$m_0$) of the first port group and first linear combination coefficients ($b_1, \ldots, $b\_$m_0$) of the second port group respectively.

In addition, a corresponding channel quality indicator (Channel Quality Indicator, CQI) may be further obtained after linear combination is performed on the channel coefficients by using the s=2 first linear combination coefficient groups.

It should be understood that, an objective of the foregoing obtaining method is to obtain the s=2 first linear combination coefficient groups to maximize a channel capacity of a data channel when RI=1. When RI>1, methods for calculating first linear combination coefficients of each port group are similar, and differ only in that each port group transmits RI-layer data to the terminal device simultaneously. The terminal device may determine first linear combination coefficients of data of each layer of each port group separately. For example, when RI=2, the terminal device may obtain two right primary singular vectors x1=[$v_1, \ldots, $v\_$m_1$, $u_1, \ldots, $u\_$m_1$] and x2=[$w_1, \ldots, $w\_$m_1$, $z_1, \ldots, $z\_$m_1$] of X by performing singular value decomposition on the channel coefficient X or by using other methods. ($v_1, \ldots, $v\_$m_1$) may be used as first linear combination coefficients of first-layer data of the first port group; ($u_1, \ldots, $u\_$m_1$) may be used as first linear combination coefficients of first-layer data of the second port group; ($w_1, \ldots, $w\_$m_1$) may be used as first linear combination coefficients of second-layer data of the first port group; and ($z_1, \ldots, $z\_$m_1$) may be used as first linear combination coefficients of second-layer data of the second port group.

Optionally, ($v_1, \ldots, $v\_$m_1$) and ($u_1, \ldots, $u\_$m_1$) may be further quantized, and the two quantized vectors are used as first linear combination coefficients of the first-layer data of the first port group and first linear combination coefficients of the first-layer data of the second port group respectively; ($w_1, \ldots, $w\_$m_1$) and ($z_1, \ldots, $z\_$m_1$) are quantized, and the two quantized vectors are used as first linear combination coefficients of the second-layer data of the first port group and first linear combination coefficients of the second-layer data of the second port group respectively.

By comparing CQIs in cases of different RIs, the terminal device may report an RI corresponding to a highest CQI and first linear combination coefficients for the data channel. In addition, the terminal device further needs to report numbers of the selected $m_1$ ports.

Therefore, the s first linear combination coefficient groups include RI linear combination coefficient groups.

After receiving the s first linear combination coefficient groups reported by the terminal device, the base station may further determine a $W_2$ codebook corresponding to the s first linear combination coefficient groups.

Optionally, a structure of the $W_2$ codebook structure may be expressed as:

$$W_2 = \begin{bmatrix} c_{1,1} & c_{1,2} & \cdots & c_{1,RI} \\ c_{2,1} & c_{2,2} & \cdots & c_{2,RI} \end{bmatrix}, \quad (1.4)$$

where $c_r = [c_{1,r,1}, \ldots, c_{1,r,m_1}]^T$ represents linear combination coefficients corresponding to the selected $m_1$ ports in the first polarization direction, in an $r^{th}$ coefficient group in the first linear combination coefficient group, and $c_{2,r} = [c_{2,r,1}, \ldots, c_{2,r,m_1}]^T$ represents linear combination coefficients corresponding to the selected $m_1$ ports in the second polarization direction, in the $r^{th}$ coefficient group in the first linear combination coefficient group, where $r=1, \ldots,$ and RI is a positive integer greater than or equal to 1.

A frequency domain granularity (such as a wideband feedback, a subband feedback, or a partial bandwidth feedback) of each first linear combination coefficient group may be configured by the base station or recommended by the terminal device. A quantity of quantized bits of amplitudes and a quantity of quantized bits of phases of each first linear combination coefficient group may be configured by the base station, or recommended by the terminal device.

Optionally, numbers of the $m_1$ ports reported by the terminal device may also be indicated in a form of a codebook. For example, an indication of the $m_1$ ports is expressed as a $W_1$ codebook, and a structure of the $W_1$ codebook is:

$$W_1 = \begin{bmatrix} e_{\pi_1(1)}^{m_0}, e_{\pi_1(2)}^{m_0} \cdots, e_{\pi_1(m_1)}^{m_0} & \\ & e_{\pi_2(1)}^{m_0}, e_{\pi_2(2)}^{m_0} \cdots, e_{\pi_2(m_1)}^{m_0} \end{bmatrix}, \quad (1.5)$$

where $e_i^{m_0}$ represents a column vector whose length is $m_1$, an $i^{th}$ element in $e_i^{m_0}$ is 1, all other elements in $e_i^{m_0}$ are 0, $\pi_1(j) \in \{1, 2, \ldots, m_0\}(j=1, \ldots, m_0)$ represents port numbers selected from the first port group, and $\pi_2(j) \in \{1, 2, \ldots, m_0\}(j=1, \ldots, m_0)$ represents port numbers selected from the second port group.

Optionally, the $W_1$ codebook may be reported in a wideband manner. Optionally, the $W_1$ codebook may be reported in a long term manner, and a reporting period is longer than a reporting period of the $W_2$ codebook. Optionally, the $W_2$ codebook is reported in a subband manner.

Optionally, the terminal device may perform reporting based on a double-codebook structure. In this case, a reporting form may also be a codebook structure of a product of $W_1$ and $W_2$. To be specific, the terminal device reports selected port numbers and s first linear combination coefficient groups by reporting a $W_1 * W_2$ codebook.

Optionally, after receiving the $W_1 * W_2$ codebook reported by the terminal device, the base station may determine a first precoding matrix used for data transmission. For example, the first precoding matrix P may satisfy the following expression:

$$P = \begin{bmatrix} u_1, \ldots, u_{m_0} & \\ & u_1, \ldots, u_{m_0} \end{bmatrix} W_1 W_2.$$

Optionally, with reference to $W_1 * W_2$ codebooks reported by a plurality of terminal devices, the base station may further comprehensively decide a first precoding matrix applied to data of each terminal device.

Optionally, the terminal device may calculate a CQI based on the $W_1 * W_2$ codebook and measured channel coefficients of m ports.

It should also be understood that, this embodiment of the present invention is not limited to the foregoing obtaining method. For example, for different channels, objectives of obtaining the first linear combination coefficients may also be other objectives. For example, because a transmission solution for a downlink control channel is transmit diversity, an objective of selecting the s first linear combination coefficient groups may be maximizing a signal-to-noise ratio in signal detection.

In other words, objectives of obtaining the first linear combination coefficients may vary depending on different channel types and data transmission modes. For example, an objective of obtaining the first linear combination coefficients may be maximizing a signal-to-noise ratio in data detection or maximizing an equivalent channel capacity. In this way, a principle of obtaining linear combination coefficients may be changed flexibly for different channel types and/or requirements of different transmission modes, so that a flexible precoding design is implemented for subsequent data transmission.

Embodiment 2

Figure 4:
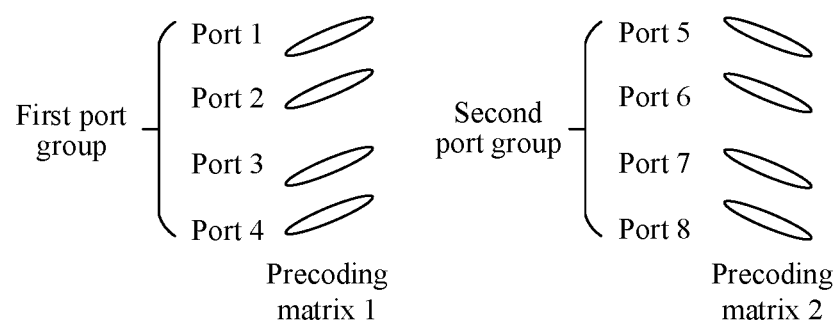
FIG. 4 is another schematic diagram of grouping according to an embodiment of the present invention.

A base station groups m=8 ports into n=2 port groups, where each port group corresponds to one precoding matrix, as shown in FIG. 4. Reference signals of each port group, after being precoded, are transmitted by antennas of each port group.

The base station transmits m reference signals on the m ports, where the reference signals are used by a terminal device to perform channel measurements.

The terminal device may obtain, through estimation, channel matrices H and G of downlink channels from two port groups to the terminal device by measuring the m reference signals, where dimensions of both the two matrices are $m_0 * 4$, and $m_0$ is a quantity of antennas of the terminal device. The terminal device performs singular value decomposition on the channel matrices corresponding to the two port groups separately to obtain a primary eigenvector $v_1$ of H and a primary eigenvector $v_2$ of G, where both $v_1$ and $v_2$ are vectors whose dimensions are 4*1.

Optionally, the terminal device may first calculate equivalent channels H_eff and G_eff of the two port groups, and perform singular value decomposition or other calculation on a composite channel F=[H_eff G_eff], to obtain a primary eigenvector u, where $u=(u_1, u_2)$, and is a vector whose dimensions are 2*1, and includes two complex numbers $u_1$ and $u_2$, $(u_1, u_2)$ are second linear combination coefficients. H_eff=H*$v_1$, G_eff=G*$v_2$, and H_eff and G_eff are separately vectors of dimension m*1.

Then the terminal device determines, based on a base vector group of each port group and primary eigenvectors (v1, v2) of each port group, base vectors selected from the base vector group of each port group, obtains first linear combination coefficients $(a_1, \ldots, a\_o_1)$ of a first port group based on selected base vectors of the first port group, and obtains first linear combination coefficients $(b_1, \ldots, b\_o_2)$ of a second port group based on information of selected base vectors of the second port group. Optionally, the first linear combination coefficients $(a_1, \ldots, a\_o_1)$ and $(b_1, \ldots, b\_o_2)$ may be quantized or may not be quantized.

Optionally, the terminal device may also first determine, based on a base vector group of each port group and primary eigenvectors (v1, v2) of each port group, base vectors selected from the base vector group of each port group, obtain first linear combination coefficients ($a_1, \ldots, a\_o_1$) of a first port group based on selected base vectors of the first port group, and obtain first linear combination coefficients ($b_1, \ldots, b\_o_2$) of a second port group based on information of selected base vectors of the second port group. Optionally, the first linear combination coefficients ($a_1, \ldots, a\_o_1$) and ($b_1, \ldots, b\_o_2$) may be quantized or may not be quantized.

Then the terminal device calculates equivalent channels H_eff and G_eff of the two port groups, where H_eff=H*$w_1$, G_eff=G*$w_2$, $w_1$ is a precoding vector that is obtained after linear combination is performed on the selected base vectors of the first port group by using the first linear combination coefficients of the first port group, and $w_2$ is a precoding vector that is obtained after linear combination is performed on the selected base vectors of the second port group by using the first linear combination coefficients of the second port group. Optionally, $w_1$ and $w_2$ may also be obtained in other manners.

Based on H_eff and G_eff that are just obtained, the terminal device performs singular value decomposition or other calculation on a composite channel F=[H_eff G_eff], to obtain a primary eigenvector u, where u=($u_1, u_2$), and is a vector whose dimensions are 2*1, and includes two complex numbers $u_1$ and $u_2$. The quantized or non-quantized ($u_1, u_2$) are second linear combination coefficients.

The terminal device transmits s=2 first linear combination coefficient groups, s second linear combination coefficients, and base vector information to the base station, where the base vector information may be used to indicate base vectors of each of s port groups. For example, the base vector information may include indication information ($p_1, \ldots, p\_o_2$) of the selected base vectors of the first port group and indication information ($q_1, \ldots, q\_o_2$) of the selected base vectors of the second port group.

The base station may determine the base vectors of each port group based on the base vector information, and perform linear combination on the base vectors of each port group by using each first linear combination coefficient group, to generate a second precoding matrix of each port group. Then linear combination is performed on s second precoding matrices of the s port groups by using the s second linear combination coefficients, to obtain a first precoding matrix. In subsequent data transmission, the base station may use the first precoding matrix to precode data, and this can increase a data transmission rate and/or improve transmission reliability. The base station may also obtain the first precoding matrix in other manners. This is not limited herein.

Optionally, the base station may further transmit first configuration information to the terminal device, or the terminal device transmits first configuration information to the base station. The first configuration information is used to indicate at least one of a frequency domain granularity of a phase and a frequency domain granularity of an amplitude of each second linear combination coefficient, and a quantity of quantized bits of the phase and a quantity of quantized bits of the amplitude of each second linear combination coefficient.

Optionally, the base station may further transmit second configuration information of each of the n port groups to the terminal device; or the terminal device transmits second configuration information of each of the n port groups to the base station. The second configuration information is used to indicate the base vector group of each port group. Optionally, the base station may configure the second configuration information of each of the n port groups separately.

In some embodiments, the base vectors used by the terminal device to determine first linear combination coefficients of each port group are selected from the base vector group indicated by the second configuration information. The base vector information transmitted by the terminal device to the base station may be used to indicate the selected base vectors of each port group. For example, the base vector information may be used to indicate locations of the selected base vectors of each port group in the base vector group, or the base vector information may be used to indicate identifiers of the selected base vectors of each port group.

Optionally, the terminal device may further calculate a CQI based on the composite channel F and the second linear combination coefficients ($u_1, u_2$). For example, in an SU-MIMO transmission assumption, a precoding matrix is designed for data based on F and ($u_1, u_2$), and a received signal-to-noise ratio is a function of F and ($u_1, u_2$). The CQI may be calculated based on the received signal-to-noise ratio. Then the terminal device may transmit the CQI to the base station.

The foregoing calculation is designed for RI=1. When RI>1, methods for calculating first linear combination coefficients, second linear combination coefficients, and a corresponding CQI are similar, and differ in that RI data channels exist from each port group to the terminal device, and the terminal device may separately determine first linear combination coefficients of data of each of RI layers corresponding to each port group, and RI second linear combination coefficient groups (each second linear combination coefficient group includes s second linear combination coefficients). By comparing CQIs in cases of different RI values, the terminal device may select an RI corresponding to a highest CQI, report a corresponding first linear combination coefficient group and a second linear combination coefficient, and report the corresponding RI value and the CQI.

It should be noted that, signals of each port group are transmitted by using antennas in a same polarization direction. To be specific, each port group corresponds to the same polarization direction of the antennas.

Figure 5:
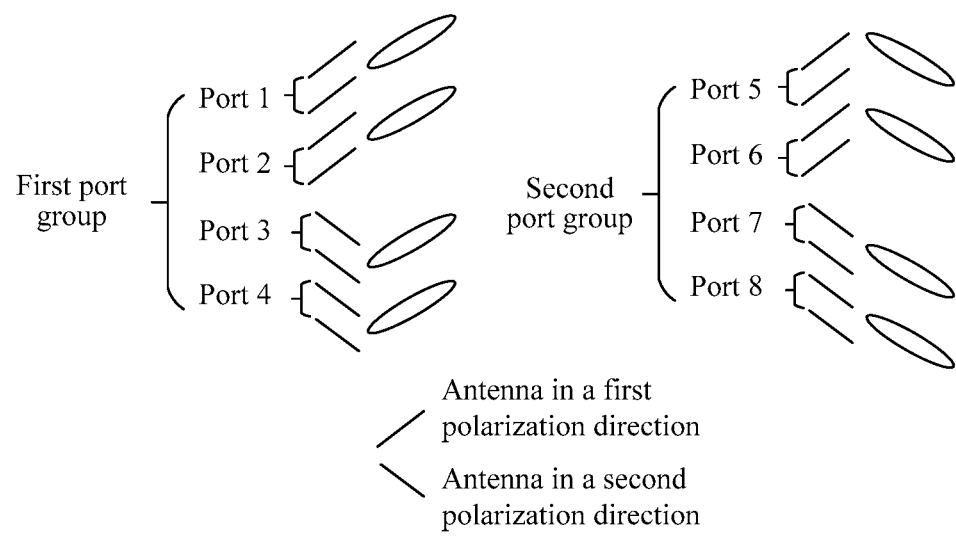
FIG. 5 is another schematic diagram of grouping according to an embodiment of the present invention.

Alternatively, signals of each port group may be further transmitted by using antennas in two polarization directions. To be specific, each port group corresponds to two polarization directions of the antennas. In this case, ports corresponding to different polarization directions of the antennas in each port group may be further grouped into different subgroups. As shown in FIG. 5, a port 1 and a port 2 corresponding to an antenna in a first polarization direction in a first port group may be used as a first subgroup, and a port 3 and a port 4 corresponding to an antenna in a second polarization direction are used as a second subgroup. A second port group is similar to this.

In the foregoing descriptions, the base station groups m=8 ports into two port groups, where each port group corresponds to one precoding matrix. In an actual system, the base station may group m=8 ports into n port groups, where n is a positive divisor of m. Reference signals of each port group, after being precoded, are transmitted by antennas of each port group. A precoding matrix of a $j^{th}$ port group is $u_j$, where j=1, . . . , n. The base station transmits m reference signals on the m ports, where the m reference signals are used by the terminal device to perform channel measurements.

The terminal device may obtain, through estimation by measuring the m reference signals, a channel matrix of downlink channels from each port group to the terminal device. The terminal device may select s port groups from the n port groups by measuring some parameters, where s is a positive integer less than or equal to n. Optionally, the terminal device may select s port groups with highest RSRP by measuring reference signal received power RSRP (reference signal received power) of each port group. Optionally, the terminal device may also select s port groups with highest RSRQ by measuring reference signal received quality RSRQ (reference signal received quality) of each port group. The selection of s may be recommended by the UE, or may be configured by the base station by transmitting signaling.

By selecting the s port groups, the terminal device may use the foregoing method to calculate first linear combination coefficients and second linear combination coefficients of the s port groups.

Embodiment 3

A base station groups m ports into n port groups, where each port group includes $p_i$ ports, and $p_1+p_2+\ldots+p_n=m$. In this embodiment, $p_i=p=m/n$ is used as an example for description. In each port group, a same quantity of antenna ports in two polarization directions may be included, or p ports in a same polarization direction may be included. Each port group corresponds to one precoding matrix. As shown in FIG. 5, m=8, and n=2. Reference signals of each port group, after being precoded, are transmitted by antennas of each port group. A precoding matrix of a $j^{th}$ port group is $u_j$, where j=1, ..., n. Among p ports in each port group, an $x1^{st}$ port in a first port group and an $x2^{nd}$ port in a second port group to an $xn^{th}$ port in an $n^{th}$ port group correspond to x same physical antennas or transceiver units (transceiver unit, TRX). For example, a simplest case is: an $i^{th}$ port in each port group corresponds to x same physical antennas or TXRUs. Without loss of generality, the following content in this embodiment of the present invention is described by using an example in which an $i^{th}$ (i=1, ..., 4) port in each port group corresponds to x same physical antennas or TXRUs. For a more general case in which a port corresponds to an antenna, the solution in this embodiment of the present invention is still applicable.

The base station transmits m reference signals on the m ports, where the m reference signals are used by a terminal device to perform channel measurements.

The terminal device measures reference signals of the n port groups, selects s port groups from the n port groups, and reports an indication of the s port groups, where s is a positive integer less than or equal to n. Optionally, the terminal device may select s port groups with highest RSRP by measuring reference signal received power RSRP (reference signal received power) of each port group. Optionally, the terminal device may also select s port groups with highest RSRQ by measuring reference signal received quality RSRQ (reference signal received quality) of each port group. A value of s may be recommended by the UE, or may be configured by the base station by transmitting signaling. This embodiment is described by using an example in which the UE selects a first port group and a second port group, that is, s=2.

It is assumed that channel matrices of downlink channels from two port groups selected by the UE to the terminal device are expressed as $H=[H_1, H_2, H_3, H_4]$ and $G=[G_1, G_2, G_3, G_4]$, dimensions of which are both $r_0*4$, where $r_0$ is a quantity of antennas of the terminal device. $H_i$(i=1, ..., 4) is a downlink channel matrix from an $i^{th}$ port in the first port group to the terminal device, and the downlink channel matrix $H_i$ is a product of a physical downlink channel matrix $H_{0,i}$ from x (x is a positive integer) antennas or TXRUs corresponding to the $i^{th}$ port to the terminal device and a corresponding precoding matrix $u_1$. To be specific, $H_i=H_{o,i}*u_1$, and $u_1$ is a column vector whose length is x, where i=1, ..., 4. In the first port group, a first port and a second port are ports (corresponding to a port 1 and a port 2 in FIG. 5) in a first polarization direction, that is, the first port and the second port correspond to antennas in the first polarization direction; a third port and a fourth port are ports (corresponding to a port 3 and a port 4 in FIG. 5) in a second polarization direction, that is, the third port and the fourth port correspond to antennas in the second polarization direction.

Similarly, $G_i$(i=1, ..., 4) is a downlink channel matrix from an $i^{th}$ port in the second port group to the terminal device, and the downlink channel matrix $G_i$ is a product of a physical downlink channel matrix $H_{0,i}$ from x (x is a positive integer) antennas corresponding to the $i^{th}$ port to the terminal device and a corresponding precoding matrix $u_2$. To be specific, $G_i=H_{0,i}*u_2$, and $u_2$ is a column vector whose length is x, where i=1, ..., 4. In the second port group, a first port and a second port are ports (corresponding to a port 5 and a port 6 in FIG. 5) in a first polarization direction, that is, the first port and the second port correspond to antennas in the first polarization direction; a third port and a fourth port are ports (corresponding to a port 7 and a port 8 in FIG. 5) in a second polarization direction, that is, the third port and the fourth port correspond to antennas in the second polarization direction. Therefore, an $i^{th}$=1, ..., 4) port in the first port group and an $i^{th}$ port in the second port group correspond to x same physical antennas or TXRUs.

After the s port groups are selected, the terminal device determines and reports s first linear combination coefficient groups. The s first linear combination coefficient groups are used to perform linear combination on the s selected port groups. When linear combination is performed, an $x_1^{th}$ port in a first port group is linearly combined with an $x_2^{th}$ port in a second port group to an $x_s^{th}$ port in an $s^{th}$ port group in the s port groups, $1 \leq x_w \leq p$, $1 \leq w \leq s$, $2 \leq s \leq n$, and $x_w$, w, and s are integers; and the $x_1^{th}$ port in the first port group, and the $x_2^{th}$ port in the second port group to the $x_s^{th}$ port in the $s^{th}$ port group correspond to same antennas. As described above, the example in which an $i^{th}$ (i=1, ..., 4) port in each port group corresponds to x same physical antennas or TXRUs is used in this embodiment of the present invention; therefore, when linear combination is performed, linear combination is performed between $i^{th}$ ports in all of the s port groups. The terminal device may obtain, based on the s first linear combination coefficient groups, downlink channel coefficients corresponding to a group of new ports (referred to as second ports). The base station may determine, based on the s first linear combination coefficient groups reported by the terminal device and the precoding matrix corresponding to the s port groups, a precoding matrix corresponding to the second ports.

The terminal device may determine the s first linear combination coefficient groups by using a plurality of methods. The following uses some examples for description.

Optionally, the terminal device obtains a first linear combination coefficient corresponding to each port in two port groups separately. For example, the terminal device concatenates downlink channel matrices of $i^{th}$ ports in two port groups, and performs singular value decomposition on a channel matrix obtained by concatenating to obtain a primary eigenvector of the channel matrix. For example, the terminal device performs singular value decomposition on a downlink channel matrix $[H_i\ G_i]$ obtained by concatenating those of $i^{th}$ ports in two selected port groups, and obtains a primary eigenvector $\alpha_i=[\alpha_{1i}\ \alpha_{2i}]^T$ of the channel matrix. Further, a coefficient matrix whose dimensions are $(sm/n)\times(m/n)$ may be obtained:

$$C = \begin{bmatrix} \alpha_{11} & & & \\ \alpha_{21} & & & \\ & \alpha_{12} & & \\ & \alpha_{22} & & \\ & & \alpha_{13} & \\ & & \alpha_{23} & \\ & & & \alpha_{14} \\ & & & \alpha_{24} \end{bmatrix} \quad (3.1)$$

where $(\alpha_{11}\ \alpha_{12}\ \alpha_{13}\ \alpha_{14})$ in the coefficient matrix are first linear combination coefficients of the selected first port group (corresponding to the port 1 to the port 4 in FIG. 5), and respectively correspond to the first port to the fourth port in the first port group; $(\alpha_{21}\ \alpha_{22}\ \alpha_{23}\ \alpha_{24})$ are first linear combination coefficients of the selected second port group (corresponding to the port 5 to the port 8 in FIG. 5), and respectively correspond to the first port to the fourth port in the second port group.

Optionally, the terminal device may further obtain linear combination coefficients of all ports in a same polarization direction in each port group in a unified manner. For example, the terminal device obtains linear combination coefficients for p/2 ports in the first polarization direction in a unified manner. For example, an average channel correlation matrix whose dimensions are s×s may be obtained by using the following method:

$$\sum_{i=1}^{p/2} [H_i\ G_i]^H [H_i\ G_i] \quad (3.2)$$

The terminal device performs eigenvalue decomposition on the average channel correlation matrix to obtain a primary eigenvector whose dimensions are s×1. In this embodiment of the present invention, s=2. In this case, the obtained primary eigenvector may be expressed as $\alpha=[\alpha_1\ \alpha_2]^T$. $\alpha_1$ is a linear combination coefficient of each port in the first polarization direction in the first port group, and $\alpha_2$ is a linear combination coefficient of each port in the first polarization direction in the second port group. Likewise, linear combination coefficients of each port in the second polarization direction in the two port groups may be obtained, and are $\beta_1$ and $\beta_2$ respectively. Therefore, $(\alpha_1\ \alpha_1\ \beta_1\ \beta_1)$ or $(a_1,\beta_1)$ may be referred to as linear combination coefficients of the first port group (corresponding to the port 1 to the port 4 in FIG. 5), and correspond to the first port to the fourth port in the first port group respectively. $(\alpha_2\ \alpha_2\ \beta_2\ \beta_2)$ or $(\alpha_2,\beta_2)$ are linear combination coefficients of the second port group (corresponding to the port 5 to the port 8 in FIG. 5), and correspond to the first port to the fourth port in the second port group respectively. In this case, the coefficient matrix may be expressed as:

$$C = \begin{bmatrix} \alpha_1 & & & \\ \alpha_2 & & & \\ & \alpha_1 & & \\ & \alpha_2 & & \\ & & \beta_1 & \\ & & \beta_2 & \\ & & & \beta_1 \\ & & & \beta_2 \end{bmatrix} \quad (3.3)$$

Optionally, the terminal device may calculate the first linear combination coefficients of the s port groups for a channel of each subband separately, or may calculate the first linear combination coefficients of the s port groups in a wideband. Optionally, a frequency domain granularity of amplitudes and a frequency domain granularity of phases of first linear combination coefficients of each of the s port groups may be configured by the base station by transmitting configuration information, or recommended by the terminal device to the base station. Optionally, a quantity of quantized bits of the phases and a quantity of quantized bits of the amplitudes of the first linear combination coefficients of each of the s port groups may be configured by the base station by transmitting configuration information, or recommended by the terminal device to the base station.

Optionally, the first linear combination coefficients of the s port groups may also be obtained by using other methods. This is not limited herein.

The terminal device may determine a $W_3$ codebook based on the first linear combination coefficients of the s port groups.

The $W_3$ codebook may be in a plurality of forms. Optionally, the $W_3$ codebook may include at least one matrix whose dimensions are $(sp)\times p$, where p is a quantity of ports included in each port group. When the base station uses a dual polarization antenna, each port group may include p/2 ports in a first polarization direction and p/2 ports in a second polarization direction. Optionally, a form of each $W_3$ codebook may be expressed as:

$$W_3 = \begin{bmatrix} C_1 & \\ & C_2 \end{bmatrix} \quad (3.4)$$

where $C_1$ is a coefficient matrix of a port corresponding to the first polarization direction in the s selected port groups, and dimensions of the coefficient matrix are $(sp/2)\times(p/2)$ $C_2$ is a coefficient matrix of a port corresponding to the second polarization direction in the s selected port groups, and dimensions of the coefficient matrix are $(sp/2)\times(p/2)$, and a form of $C_i(i=1, 2)$ may be expressed as:

$$C_i = \begin{bmatrix} \alpha_1^i & & & \\ & \alpha_2^i & & \\ & & \ddots & \\ & & & \alpha_{p/2}^i \end{bmatrix} \quad (3.5)$$

where a vector $\alpha_w^i=[\alpha_{1,w}^i, \alpha_{2,w}^i, \ldots, \alpha_{s,w}^i]^T$, a coefficient $\alpha_{jw}^i$ is a linear combination coefficient of a $w^{th}$ port corresponding to an $i^{th}$ polarization direction in a $j^{th}$ port group in the s port groups, $w=1,\ldots p/2$, and i=1 or 2. To be specific, for s port groups selected for the $i^{th}$ polarization direction, linear combination is performed on $w^{th}$ ports in the s port groups separately by using coefficients $\alpha_{1,w}^i, \alpha_{2,w}^i, \ldots, \alpha_{s,w}^i$, and a $w^{th}$ port in a new port group may be obtained, where $w=1, \ldots p/2$.

When the base station uses a single polarization antenna, a form of the $W_3$ codebook may be expressed as:

$$W_3 = \begin{bmatrix} \alpha_1 & & & \\ & \alpha_2 & & \\ & & \ddots & \\ & & & \alpha_p \end{bmatrix} \quad (3.6)$$

where $\alpha_w = [\alpha_{1w}, \alpha_{2w}, \ldots, \alpha_{sw}]^T$, linear combination is performed on $w^{th}$ ports in the s port groups separately by using coefficients $\alpha_{1w}, \alpha_{2w}, \ldots, \alpha_{sw}$, and a $w^{th}$ port in a new port group may be obtained, where $w=1, \ldots, p$.

As can be learned, structures of the $W_3$ codebook in the expressions (3.4) and (3.5) may also be uniformly expressed in the form in (3.6). Therefore, when the base station uses a dual polarization antenna or a single polarization antenna, a structure of $W_3$ may be expressed as:

$$W_3 = \begin{bmatrix} \alpha_1 & & & \\ & \alpha_2 & & \\ & & \ddots & \\ & & & \alpha_p \end{bmatrix} \quad (3.7)$$

where $\alpha_w = [\alpha_{1,w}, \alpha_{2,w}, \ldots, \alpha_{s,w}]^T$.

Optionally, $\alpha_w$ and $\alpha_v$ may be equal or may be not equal, depending on a manner of obtaining linear combination coefficients of different ports in a same port group, for example, various manners described above, where $w,v \in \{1, \ldots, p/2\}$, $i \in \{1, 2\}$.

If the first linear combination coefficients of the ports are obtained separately, that is, $\alpha_w$ and $\alpha_v$ may be not equal, the terminal device needs to report $\alpha_w$ corresponding to each w in the $W_3$ codebook, where $w=1, \ldots p/2$, so that the base station determines the $W_3$ codebook. Separately obtaining and reporting the first linear combination coefficients of the ports can improve feedback precision of channel state information, and provide higher freedom for forming a new port group subsequently. If the first linear combination coefficient of each port in a same polarization direction is the same, when reporting the $W_3$ codebook, the terminal device needs to report only a linear combination coefficient (for example, report only $\alpha_1$, $\alpha_{1+p/2}$ (3.7)) corresponding to one port. This can reduce reporting overheads. For a same polarization direction, whether the first linear combination coefficients of the ports are reported separately (that is, $\alpha_w$ and $\alpha_v$ are not equal, $w \neq v$) or reported together (that is, $\alpha_w$ and $\alpha_v$ are equal, where $w \neq v$) may be specified in a predefined manner, or configured by the base station by transmitting configuration information, or recommended by the terminal device by transmitting configuration information.

The base station may determine, based on the s first linear combination coefficient groups, a precoding matrix corresponding to a new port group. For example, the base station uses a dual polarization antenna. It is assumed that precoding matrices corresponding to ports in the first polarization direction in the s port groups selected by the terminal device are $u_{g_1(1)}, \ldots, u_{g_1(s)}$ respectively, and that precoding matrices corresponding to ports in the second polarization direction are $u_{g_1(1)}, \ldots, u_{g_1(s)}$ respectively, where $g_1(1), \ldots,$ $g_1(s) \in \{1, \ldots n\}$ are identifiers of ports corresponding to the $i^{th}$ polarization direction in the s port groups, and $i=1$ or $i=2$ (for example, if $n=4$, $g_i(1)=2$, $g_i(2)=4$ indicate that the terminal device selects a second port group and a fourth port group from the $n=4$ port groups for the $i^{th}$ polarization direction). The terminal device may select s same port groups for two polarization directions, that is, $\{g_1(1), \ldots, g_1(s)\} = \{g_2(1), \ldots, g_2(s)\}$. The base station calculates, based on a precoding matrix corresponding to each port group, a precoding matrix corresponding to each port in a new port group. For example, a precoding matrix corresponding to a $w^{th}$ port among ports in the $i^{th}$ polarization direction in the new port group is the following linear combination:

$$v_w^i = [u_{g_i(1)}, \ldots, u_{g_i(s)}]\alpha_w^i = \Sigma_{j=1}^s u_{g_i(j)} \alpha_{j,w}^i \quad (3.8)$$

where $w=1, \ldots, p/2$. Therefore, the base station may obtain a precoding matrix corresponding to each port in the new port group. Therefore, the base station performs linear combination on precoding matrices of the s port groups by using the first linear combination coefficients.

The terminal device may determine, based on the $W_3$ codebook, a downlink channel matrix corresponding to the new port group. For example, assuming that $H_{1,w}^1, \ldots, H_{s,w}^1$ represent downlink channel coefficients of a $w^{th}$ port in each port group, estimated by the terminal device for the first polarization direction in the s selected port groups (the terminal device may obtain, through estimation, the downlink channel coefficients by measuring reference signals transmitted by the base station), a downlink channel coefficient of a $w^{th}$ port in the new port group for the first polarization direction may be calculated as $H_w^i = \Sigma_{j=1}^s H_{j,w}^i \alpha_{j,w}^i$. A downlink channel matrix of the new port group may be expressed as:

$$\overline{H} = [H_1^1, \ldots, H_{p/2}^1, H_1^2, \ldots, H_{p/2}^2] \quad (3.9)$$

Optionally, the $W_3$ codebook may also be in other forms. For example, if the base station uses a dual polarization antenna, $W_3$ satisfies the following expression:

$$W_3 = \begin{bmatrix} C_1 & \\ & C_2 \end{bmatrix} \quad (3.10)$$

where $$C_i = \begin{bmatrix} C_1^i \\ \vdots \\ C_s^i \end{bmatrix},$$

$i=1$ or 2, $$C_j^i = \begin{bmatrix} \alpha_{j,1}^i & & \\ & \ddots & \\ & & \alpha_{j,p/2}^i \end{bmatrix}$$

is a diagonal matrix whose dimensions are $p/2 \times p/2$, elements $(\alpha_{j,1}^1, \alpha_{j,2}^1, \ldots, \alpha_{j,p/2}^1, \alpha_{j,1}^2, \alpha_{j,2}^2, \ldots, \alpha_{j,p/2}^2)$ are a $j^{th}$ first linear combination coefficient group in the s first linear combination coefficient groups, and $j=1, \ldots, s$. If the base station uses a single polarization antenna, $W_3$ satisfies the following expression:

$$W_3 = \begin{bmatrix} C_1 \\ \vdots \\ C_s \end{bmatrix} \quad (3.11)$$

where $$C_j = \begin{bmatrix} \alpha_{j,1} & & \\ & \ddots & \\ & & \alpha_{j,p} \end{bmatrix}$$

is a diagonal matrix whose dimensions are p×p, $(\alpha_{j,1}, \alpha_{j,2}, \ldots, \alpha_{j,p})$ is a $j^{th}$ first linear combination coefficient group in the s first linear combination coefficient groups, and j=1, ..., s.

The method for calculating the precoding matrix of the new port group by the base station by using the expression (3.10) or (3.11) is consistent with that using the expression (3.8). The method for calculating the downlink channel coefficient of the new port group by the terminal device by using the expression (3.10) or (3.11) is consistent with that using the expression (3.9).

For the base station side, a difference between the expression (3.10) or (3.11) and the expression (3.7) lies in that methods for arranging a corresponding precoding matrix of each port group by the base station are different. For example, the base station uses a dual polarization antenna, s=2, and p=4. It is assumed that precoding vectors of two selected port groups are u1 and u2. If the base station virtualizes, by using a matrix shown in the following (3.12), s port groups corresponding to antennas or TXRUs, the base station may use the expression (3.7) to obtain a precoding matrix (3.13) corresponding to each port in a new port group:

$$\begin{bmatrix} u_1 & u_2 & & & \\ & & u_1 & u_2 & \\ & & & & u_1 & u_2 \\ & & & & & & u_1 & u_2 \end{bmatrix} \quad (3.12)$$

$$\begin{bmatrix} \overline{u_1} \\ \overline{u_2} \\ \overline{u_3} \\ \overline{u_4} \end{bmatrix} = \begin{bmatrix} u_1 & u_2 & & & \\ & & u_1 & u_2 & \\ & & & & u_1 & u_2 \\ & & & & & & u_1 & u_2 \end{bmatrix} \begin{bmatrix} \alpha_1 & & & \\ & \alpha_2 & & \\ & & \ddots & \\ & & & \alpha_p \end{bmatrix} \quad (3.13)$$

where $\overline{u}_1, \overline{u}_2, \overline{u}_3, \overline{u}_4$ are respectively precoding matrices corresponding to a first port to a fourth port in the new port group.

If the base station virtualizes, by using a matrix shown in the following (3.14), s port groups corresponding to antennas or TXRUs, the base station may use the expression (3.10) to obtain a precoding matrix (3.15) corresponding to each port in a new port group:

$$\begin{bmatrix} u_1 & & u_2 & \\ & u_1 & & u_2 \\ & & u_1 & & u_2 \\ & & & u_1 & & u_2 \end{bmatrix} \quad (3.14)$$

$$\begin{bmatrix} \overline{u_1} \\ \overline{u_2} \\ \overline{u_3} \\ \overline{u_4} \end{bmatrix} = \begin{bmatrix} u_1 & & u_2 & \\ & u_1 & & u_2 \\ & & u_1 & & u_2 \\ & & & u_1 & & u_2 \end{bmatrix} \begin{bmatrix} C_1^1 \\ C_2^1 \\ C_1^2 \\ C_2^2 \end{bmatrix} \quad (3.15)$$

where $\overline{u}_1, \overline{u}_2, \overline{u}_3, \overline{u}_4$ are respectively precoding matrices corresponding to a first port to a fourth port in a new port group.

Therefore, an effect of the expression (3.10) or (3.11) is the same as an effect of the expression (3.7). Likewise, for the terminal device, an effect of the expression (3.10) or (3.11) is also the same as an effect of the expression (3.7), that is, a downlink channel coefficient of a new port group indicated by the expression (3.9) can be obtained, and a difference lies in a manner of arranging channel coefficients of s port groups by the terminal device. Still using the example in which the base station uses a dual polarization antenna, s=2, and p=4, if the terminal device uses $\lfloor H_{1,1}^1, H_{2,1}^1, H_{1,2}^1, H_{2,2}^1, H_{1,1}^2, H_{2,1}^2, H_{1,2}^2, H_{2,2}^2 \rfloor$ to concatenate downlink channel coefficients of eight ports in total in two selected port groups, a downlink channel coefficient of a new port group may be obtained by using the expression (3.7):

$$\overline{H} = \lfloor H_1^1, H_2^1, H_1^2, H_2^2 \rfloor = \quad (3.16)$$

$$[H_{1,1}^1, H_{2,1}^1, H_{1,2}^1, H_{2,2}^1, H_{1,1}^2, H_{2,1}^2, H_{1,2}^2, H_{2,2}^2] \begin{bmatrix} \alpha_1 & & & \\ & \alpha_2 & & \\ & & \ddots & \\ & & & \alpha_4 \end{bmatrix}$$

If the terminal device uses $\lfloor H_{1,1}^1, H_{1,2}^1, H_{2,1}^1, H_{2,2}^1, H_{1,1}^2, H_{1,2}^2, H_{2,1}^2, H_{2,2}^2 \rfloor$ to concatenate downlink channel coefficients of eight ports in total in two selected port groups, a downlink channel coefficient of a new port group may be obtained by using the expression (3.10):

$$\overline{H} = [H_1^1, H_2^1, H_1^2, H_2^2] = \quad (3.17)$$

$$[H_{1,1}^1, H_{1,2}^1, H_{2,1}^1, H_{2,2}^1, H_{1,1}^2, H_{1,2}^2, H_{2,1}^2, H_{2,2}^2] \begin{bmatrix} C_1^1 \\ C_2^1 \\ C_1^2 \\ C_2^2 \end{bmatrix}$$

After determining the s first linear combination coefficient groups, the terminal device may further determine base vector information and second linear combination coefficients.

The terminal device has obtained the downlink channel coefficient of the new port group according to the foregoing method. For example, when the base station uses a dual polarization antenna, the channel coefficient $\overline{H}=[H_1^1, \ldots, H_{p/2}^1, H_1^2, \ldots, H_{p/2}^2]$ shown in the expression (3.9) may be obtained. In this case, the terminal device may determine the second linear combination coefficients and the base vector information by using the following method.

The terminal device performs singular value decomposition on the downlink channel matrix $\bar{H}$ from the new port group to the terminal device to obtain R primary eigenvectors $(v_1, v_2, \ldots, v_R)$, where R is a positive integer. Each eigenvector corresponds to one data stream. For an $r^{th}$ eigenvector $(r=1, \ldots, R)$, the terminal device selects $O_r$ base vectors from the base vector group, and reports identifiers of the $O_r$ selected base vectors to the base station.

The base station and the terminal device may determine a $W_1$ codebook based on the identifiers of the $O_r$ base vectors. The base vector group may be in a form of a base vector matrix, and the base vector matrix includes 2M base vectors. The base vector may be in a plurality of forms, for example, a DFT vector.

Optionally, when the base station uses a dual polarization antenna, the base vector matrix may be expressed as:

$$B = \begin{bmatrix} B_1 & 0 \\ 0 & B_2 \end{bmatrix} \quad (3.18a)$$

where B is a matrix whose dimensions are p×2M, $B_1 = [b_1^{(1)} \, b_2^{(1)} \, \ldots \, b_M^{(1)}]$ is a base vector matrix of a port corresponding to the first polarization direction, $B_2 = [b_1^{(2)} \, b_2^{(2)} \, \ldots \, b_M^{(2)}]$ is a base vector matrix of a port corresponding to the second polarization direction, dimensions of both the two matrices are (p/2)×M, M represents a quantity of base vectors that may be selected, and $b_i^{(j)}$ (j=1, 2, i=1 ..., N) is a base vector whose length is p/2, for example, a DFT vector.

Optionally, base vector matrices of ports in two polarization directions may be the same or different, that is, $B_1$ may be equal to $B_2$ or not equal to $B_2$. Based on the $O_r$ selected base vectors, the terminal device may determine a structure of a $W_1$ codebook for the $r^{th}$ eigenvector:

$$W_1(r) = \quad (3.18b)$$

$$\begin{bmatrix} b_{\pi_{1,r}(1)}^{(1)} & b_{\pi_{1,r}(2)}^{(1)} & \cdots & b_{\pi_{1,r}(O_r)}^{(1)} & & & & \\ & & & & b_{\pi_{2,r}(1)}^{(2)} & b_{\pi_{2,r}(2)}^{(2)} & \cdots & b_{\pi_{2,r}(O_r)}^{(2)} \end{bmatrix}$$

where $\pi_{i,r}(j) \in \{1, 2, \ldots, M\}$ represents an identifier of a base vector for the $i^{th}$ polarization direction, reported by the terminal device for the $r^{th}$ eigenvector, j=1, ..., $O_r$, i=1, 2, and r=1, ..., R.

For example, M=4, $O_1$=2, $\pi_{1,1}(1)=\pi_{2,1}(1)=2$, $\pi_{1,1}(2)=\pi_{2,1}(2)=3$ indicate that the terminal device selects, from four base vectors, a second base vector and a third base vector for both the first polarization direction and the second polarization direction for the first eigenvector.

When the base station uses a single polarization antenna, the base vector matrix may be expressed as:

$$B = [B_1] \quad (3.19a)$$

where B is a matrix whose dimensions are p×M, and $B_1 = [b_1 \, b_2 \ldots b_M]$ includes all base vectors. Based on the $O_r$ selected base vectors, the terminal device and the base station may determine a structure of a $W_1$ codebook for the $r^{th}$ eigenvector as follows:

$$W_1(r) = [b_{\pi_r(1)} b_{\pi_r(2)} \ldots b_{\pi_r(O_r)}], \quad (3.19b)$$

where $\pi_r(i) \in \{1, 2, \ldots, M\}$ represents an identifier of a base vector selected by the UE for the $r^{th}$ eigenvector, $i \in \{1, \ldots, O_r\}$, and r=1, ..., R.

Optionally, when the base station uses a dual polarization antenna, the base vector matrix may also be expressed as:

$$B = \begin{bmatrix} B_1 & B_2 \\ B_1 & -B_2 \end{bmatrix} \quad (3.20a)$$

where B is a matrix whose dimensions are p×2M, and $B_1 = [b_1^{(1)} \, b_2^{(1)} \, \ldots \, b_M^{(1)}]$, $B_2 = [b_1^{(2)} \, b_2^{(2)} \, \ldots \, b_M^{(2)}]$, dimensions of both the two matrices are (p/2)×2N, and $b_i^{(j)}$ (j=1, 2, i=1, ..., M) is a base vector whose length is p/2, for example, a DFT vector. Based on the $O_r$ selected base vectors, the terminal device and the base station may determine a structure of a $W_1$ codebook for the $r^{th}$ eigenvector as follows:

$$W_1(r) = \begin{bmatrix} b_{\pi_{1,r}(1)}^{(1)} & b_{\pi_{1,r}(2)}^{(1)} & \cdots & b_{\pi_{1,r}(O_{r,1})}^{(1)} & b_{\pi_{2,r}(1)}^{(2)} & b_{\pi_{2,r}(2)}^{(2)} & \cdots & b_{\pi_{2,r}(O_{r,2})}^{(2)} \\ b_{\pi_{1,r}(1)}^{(1)} & b_{\pi_{1,r}(2)}^{(1)} & \cdots & b_{\pi_{1,r}(O_{r,1})}^{(1)} & -b_{\pi_{2,r}(1)}^{(2)} & -b_{\pi_{2,r}(2)}^{(2)} & \cdots & -b_{\pi_{2,r}(O_{r,2})}^{(2)} \end{bmatrix} \quad (3.20b)$$

where $O_{r,1}+O_{r,2}=O_r$, $\pi_{i,r}(j) \in \{1, 2, \ldots, M\}$ represents an identifier of a base vector for the $i^{th}$ polarization direction, reported by the terminal device for the $r^{th}$ eigenvector, r=1, ..., R, and j=1, ..., $O_{r,1}$ or j=1, ..., $O_{r,2}$.

Optionally, structures of the base vector matrix and the $W_1$ codebook may also be in other forms, and are not limited herein.

Optionally, the terminal device may select base vectors for all R eigenvectors in a unified manner, and in this case, $W_1(r)=W_1$, where r=1, ..., R. In this case, $O_r=O$, $\pi_{1,r}(j)=\pi_1(j)$, and $\pi_{2,r}(j)=\pi_2(j)$, where j=1, ..., O.

The terminal device obtains a linear combination coefficient of the $r^{th}$ eigenvector based on the s first linear combination coefficient groups and the $W_1$ codebook. Linear combination coefficients of RI eigenvectors are second linear combination coefficients. The terminal device reports the second linear combination coefficients. The terminal device may determine a $W_2$ codebook based on the second linear combination coefficients. Optionally, when the base station uses a dual polarization antenna, a structure of the $W_2$ codebook may be expressed as:

$$W_2 = \begin{bmatrix} c_{1,1} & c_{1,2} & \cdots & c_{1,RI} \\ c_{2,1} & c_{2,2} & \cdots & c_{2,RI} \end{bmatrix} \quad (3.21)$$

where $c_{i,r}=[c_{i,r,1}, \ldots, c_{i,r,O_r}]^T$ is a coefficient used to perform linear combination on base vectors $b_{\pi_{i,r}(1)}^{(i)}$, $b_{\pi_{i,r}(2)}^{(i)}$, ..., $b_{\pi_{i,r}(O_r)}^{(i)}$ of ports in the $i^{th}$ polarization direction in the expression (3.18b) or (3.20b), i=1 or 2, and r=1, ..., R.

When the base station uses a single polarization antenna, a structure of the $W_2$ codebook may be expressed as:

$$W_2 = [c_1 c_2 \ldots c_{Rl}] \quad (3.22)$$

where $c_r = [c_{r,1}, \ldots, c_{r,O}]^T$ is a vector whose dimensions are $O_r \times 1$, and is used to perform linear combination on base vectors $b_{\pi_r(1)}, b_{\pi_r(2)}, \ldots, b_{\pi_r(O_r)}$ in the expression (3.19b), and $r = 1, \ldots, R$.

Optionally, in the $W_2$ codebook, an amplitude of each coefficient may be fed back in a wideband manner or fed back in a subband manner. A phase of each coefficient is fed back in a subband manner.

The terminal device may approximately express, based on the $W_1$ codebook and the $W_2$ codebook, an obtained eigenvector of a channel corresponding to a new port group. For example, the $r^{th}$ eigenvector may be approximately expressed as $v_r = W_1 W_2(r)$, where $W_2(r)$ represents an $r^{th}$ column of $W_2$. Because the $r^{th}$ eigenvector is the eigenvector of the channel corresponding to the new port group, and formation of the new port group requires the $W_3$ codebook, the terminal device needs to report the $W_1$, $W_2$, and $W_3$ codebooks, where the codebooks are used by the base station to form a second precoding matrix used for data transmission and match a channel characteristic of the terminal device.

In addition, the terminal device further needs to report identifiers of ports of s selected port groups, where the identifiers are used to notify the base station of the s port groups selected by the terminal device.

The terminal device may determine a $W_4$ codebook according to an indication of the s port groups. For example, for the $W_3$ codebook in the expression (3.7), if the base station uses a dual polarization antenna, the $W_4$ codebook may be expressed in the following matrix form:

$$W_4 = \begin{bmatrix} I_{p/2} \otimes [e^s_{g_1(1)}, e^s_{g_1(2)} \ldots, e^s_{g_1(s)}] & \\ & I_{p/2} \otimes [e^s_{g_2(1)}, e^s_{g_2(2)} \ldots, e^s_{g_2(s)}] \end{bmatrix} \quad (3.23)$$

where $e_j^n$ represents a column vector whose length is n, only a $j^{th}$ element is 1, and all other elements are 0. $g_i(1), \ldots, g_i(s) \in \{1, \ldots, n\}$ are identifiers of ports corresponding to the $i^{th}$ polarization direction in the s port groups, where i=1 or i=2. $I_{P/2}$ represents an identity matrix whose dimensions are p/2. $\otimes$ represents a Kronecker product (Kronecker product).

If the base station uses a single polarization antenna, the $W_4$ codebook may be expressed in the following matrix form:

$$W_4 = [e_{g(1)}{}^n, e_{g(2)}{}^n, \ldots, e_{g(s)}{}^n] \otimes I_p \quad (3.24)$$

where $e_j^n$ represents a column vector whose length is n, only a $j^{th}$ element is 1, and all other elements are 0; $g(1), \ldots, g(s)$ are included in first indication information and used to indicate the s port groups; $I_m$ represents an identity matrix whose dimensions are m; and $\otimes$ represents a Kronecker product.

For the $W_3$ codebook in the expression (3.10) (the base station uses a dual polarization antenna), the $W_4$ codebook may be expressed in the following matrix form:

$$W_4 = \begin{bmatrix} [e^n_{g_1(1)}, e^n_{g_1(2)} \ldots, e^n_{g_1(s)}] \otimes I_{p/2} & \\ & [e^n_{g_2(1)}, e^n_{g_2(2)} \ldots, e^n_{g_2(s)}] \otimes I_{p/2} \end{bmatrix} \quad (3.25)$$

where $e_j^n$ represents a column vector whose length is n, only a $j^{th}$ element is 1, and all other elements are 0; $g_1(1), \ldots, g_1(s), g_2(1), \ldots, g_2(s) \lfloor \{1, 2, \ldots, n\}$ are included in the first indication information and used to indicate the s port groups; $I_m$ represents an identity matrix whose dimensions are m; and $\otimes$ represents a Kronecker product.

For the $W_3$ codebook in the expression (3.11) (the base station uses a single polarization antenna), the $W_4$ codebook may be expressed in the following matrix form:

$$W_4 = [e_{g(1)}{}^n, e_{g(2)}{}^n, \ldots, e_{g(s)}{}^n] \otimes I_p \quad (3.26)$$

where $e_j^n$ represents a column vector whose length is n, only a $j^{th}$ element is 1, and all other elements are 0; $g(1), \ldots, g(s)$ are included in the first indication information and used to indicate the s port groups; $I_m$ represents an identity matrix whose dimensions are m; and $\otimes$ represents a Kronecker product.

A function of the $W_4$ codebook is to select the s port groups from the n port groups, where identifier information of ports in the s selected port groups is carried in the $W_4$ codebook. The terminal device may extract channel coefficients of (m/n)*s ports in total in the s selected port groups from channel coefficients of m ports in total in the n port groups based on the $W_4$ codebook. A difference between the expression (3.23) and the expression (3.25) lies in a sequence of arranging the channel coefficients of m ports in total in the n port groups by the terminal device.

For example, it is assumed that the base station uses a dual polarization antenna, and that $H_{i,1}, \ldots, H_{i,p/2}, G_{i,1}, \ldots, G_{i,p/2}$ respectively represent downlink channel coefficients of p ports in total in an $i^{th}$ port group, where $H_{i,1}, \ldots, H_{i,p/2}$ are channel coefficients of p/2 ports in the first polarization direction, and $G_{i,1}, \ldots, G_{i,p/2}$ are channel coefficients of p/2 ports in the second polarization direction. If the terminal device arranges channel coefficients of m ports in total in the following manner:

$$[H_{1,1}, \ldots H_{1,p/2}, \ldots, H_{n,1}, \ldots, H_{n,p/2}, G_{1,1}, \ldots G_{1,p/2}, \ldots, G_{n,1}, \ldots, G_{n,p/2}]$$

that is, according to a method of first intra-group port arrangement and then inter-group port arrangement, the terminal device selects, by using the $W_4$ codebook shown in the expression (3.25), channel coefficients corresponding to s port groups. To be specific, $H_{selected} = HW_4$, where $W_4$ is shown in the expression (3.25).

If the terminal device arranges channel coefficients of m ports in total in the following manner:

$$[H_{1,1}, \ldots H_{n,1}, \ldots, H_{1,p/2}, \ldots, H_{n,p/2}, G_{1,1}, \ldots G_{n,1}, \ldots, G_{1,p/2}, \ldots, G_{n,p/2}]$$

that is, according to a method of first inter-group port arrangement and then intra-group port arrangement, the terminal device selects, by using the $W_4$ codebook shown in the expression (3.23), channel coefficients corresponding to s port groups. $H_{selected} = HW_4$, where $W_4$ is shown in the expression (3.25).

In conclusion, the terminal device reports the indication information, the s first linear combination coefficient groups, the selected base vector, and identifiers of second linear combination coefficients. The indication information includes identifiers of ports in the s selected port groups. In addition, the terminal device reports the CQI. When calculating the CQI, the terminal device needs to assume a precoding matrix W used by the base station to transmit data to the terminal device.

Optionally, W may be expressed as a product of $W_3$, $W_1$, and $W_2$: $W=W_3*W_1*W_2$. In this case, the CQI is calculated based on the identifiers of the ports in the s selected port groups and W and measured channel coefficients of the s port groups. Optionally, the indication information may be expressed in the form of the $W_4$ codebook; in this case, W may be expressed as: $W=W_4*W_3*W_1*W_2$.

Optionally, the matrix W used to calculate the CQI may also be expressed as a product of two matrices: $W=W_1'*W_2$, where $W_1'$ is a matrix including the s first linear combination coefficient groups and base vectors indicated by the base vector information; and $W_2$ is a matrix including the second linear combination coefficients, and an expression may be still that in (3.21) or (3.22).

When the base station uses a dual polarization antenna, a form of the $W_1'$ matrix may be expressed as:

$$W_1' = \begin{bmatrix} B_1' & \\ & B_2' \end{bmatrix},$$

where $$B_i' = \begin{bmatrix} C_1^i b_{\pi_{i,r}(1)}^{(i)} & C_1^i b_{\pi_{i,r}(2)}^{(i)} & \cdots & C_1^i b_{\pi_{i,r}(O_r)}^{(i)} \\ C_2^i b_{\pi_{i,r}(1)}^{(i)} & C_2^i b_{\pi_{i,r}(2)}^{(i)} & \vdots & C_1^i b_{\pi_{i,r}(O_r)}^{(i)} \\ \vdots & \vdots & \ddots & \vdots \\ C_s^i b_{\pi_{i,r}(1)}^{(i)} & C_s^i b_{\pi_{i,r}(s)}^{(i)} & \cdots & C_s^i b_{\pi_{i,r}(O_r)}^{(i)} \end{bmatrix}$$

is a matrix whose dimensions are $$\frac{p}{2} s \times O_r; \quad C_j^i = \begin{bmatrix} \alpha_{j,1}^i & & \\ & \ddots & \\ & & \alpha_{j,p/2}^i \end{bmatrix}$$

is a diagonal matrix whose dimensions are $$\frac{p}{2} \times \frac{p}{2};$$

$(\alpha_{j,1}^1, \ldots, \alpha_{j,p/2}^1, \alpha_{j,1}^2, \ldots, \alpha_{j,p/2}^2)$ is a $j^{th}$ first linear combination coefficient group in the s first linear combination coefficient groups, where $j=1, \ldots, s$, and $i=1$ or 2; $\pi_{i,r}(n) \in \{1, 2, \ldots, M\}$ represents an identifier of a base vector included in the base vector information reported by the terminal device for the $i^{th}$ polarization direction for the $r^{th}$ eigenvector, where $n=1, \ldots, O_r$, and $O_r$ is an integer greater than or equal to 2 and less than or equal to M; and $b_j^{(i)}(i=1, 2, j=1, \ldots, M)$ is a base vector whose length is p/2, for example, in the base vector matrix shown in the expression (3.18a), for example, a DFT vector. Optionally, for the R eigenvectors, the terminal device may select a same base vector, that is, $O_r=O$ and $\pi_{i,r}(j)=\pi_i(j)$, $(i=1, 2, j=1, \ldots, O)$.

When the base station uses a single polarization antenna, a form of the $W_1'$ matrix may be expressed as: $W_1'=[B_1']$, where $$B' = \begin{bmatrix} C_1 b_{\pi_r(1)} & C_1 b_{\pi_r(2)} & \cdots & C_1 b_{\pi_r(O_r)} \\ C_2 b_{\pi_r(1)} & C_2 b_{\pi_r(2)} & \vdots & C_1 b_{\pi_r(O_r)} \\ \vdots & \vdots & \ddots & \vdots \\ C_s b_{\pi_r(1)} & C_s b_{\pi_r(s)} & \cdots & C_s b_{\pi_r(O_r)} \end{bmatrix}$$

is a matrix whose dimensions are $ps \times O_r$;

$$C_j = \begin{bmatrix} \alpha_{j,1} & & \\ & \ddots & \\ & & \alpha_{j,p} \end{bmatrix}$$

is a diagonal matrix whose dimensions are p×p, and $(\alpha_{j,1}, \alpha_{j,2}, \ldots, \alpha_{j,p})$ is a $j^{th}$ first linear combination coefficient group in the s first linear combination coefficient groups, where $j=1, \ldots, s$; $\pi_r(n) \in \{1, 2, \ldots, M\}$ represents an identifier of a base vector included in the base vector information reported by the terminal device for the $r^{th}$ eigenvector, where $n=1, \ldots, O_r$, and $O_r$ is an integer greater than or equal to 2 and less than or equal to M; and $b_j(j=1, \ldots, M)$ is a base vector whose length is 2, for example, in the base vector matrix shown in the expression (3.19a), for example, a DFT vector. Optionally, for the R eigenvectors, the terminal device may select a same base vector, that is, $O_r=O$ and $\pi_r(j)=\pi(j)$, $(i=1, 2, j=1, \ldots, O)$.

The base station determines, based on the report of the terminal device and/or reports of other terminal devices, a precoding matrix for transmitting data to the terminal device.

Optionally, a value of s may be configured by the base station by transmitting first configuration information, or recommended by the terminal device by transmitting first configuration information to the base station. Optionally, the first configuration information may be further used to configure an upper limit s' of s, where $2 \leq s' \leq n$. In this case, a value of s that may be selected by the terminal device needs to satisfy $2 \leq s \leq s'$. To be specific, the first configuration information configures the terminal device to select a maximum of s' port groups and report corresponding other information. A quantity s of port groups actually selected by the terminal device may be not equal to s'. Therefore, the terminal device further needs to report an actual value of s to the base station. For example, the base station configures s'=3, and the terminal device considers, by performing a measurement, that only s=2 port groups need to be selected; in this case, the terminal device reports s=2, and other information (such as indication information, first linear combination coefficients, base vector information, and second linear combination coefficients). Allowing the terminal device to report information corresponding to less than s' port groups can avoid waste of transmit power of the base station in other s'-s channel directions that contribute little to data transmission performance. The s'-s channel directions correspond to precoding matrices of other s'-s port groups. Therefore, the base station can use the transmit power more effectively, use precoding matrices corresponding to most important s' port groups to form a new port group, and align with a location of the terminal device to improve transmission performance. In addition, allowing the terminal device to report information corresponding to less than s' port groups can reduce reporting overheads of the terminal device.

Optionally, the indication information (or the $W_4$ codebook) is fed back in a wideband manner. Optionally, the indication information (or the $W_4$ codebook) is fed back in a long-term manner.

A frequency domain granularity of each of the s first linear combination coefficient groups (or the $W_3$ codebook) may be a wideband feedback, a subband feedback, or a partial bandwidth (partial bandwidth) feedback, where a partial bandwidth feedback granularity is less than a wideband feedback granularity and is greater than a subband feedback granularity. Optionally, the feedback granularity may be predefined, for example, predefined as the wideband feedback, or predefined as the partial bandwidth feedback. Optionally, the base station may further transmit second configuration information to the terminal device, or the terminal device transmits second configuration information to the base station. The second configuration information is used to indicate a feedback frequency domain granularity of amplitudes and a feedback frequency domain granularity of phases of each of the s first linear combination coefficient groups (or the $W_3$ codebook). The feedback frequency domain granularity of the amplitudes and the feedback frequency domain granularity of the phases may be the same or different. For example, the feedback frequency domain granularity of the amplitudes is the wideband feedback, and that of the phases is the subband feedback, or both are the wideband feedback. No other feedback frequency domain granularity is excluded.

A quantity of quantized bits of the amplitudes and a quantity of quantized bits of the phases of each of the s first linear combination coefficient groups (or the $W_3$ codebook) may be predefined or configured. For example, the amplitudes of each of the s first linear combination coefficient groups may be predefined as x quantized bits, and the phases may be predefined as y quantized bits. For example, x=2 or 3, and y=2 or 3. Other values are not excluded. Alternatively, the base station may further transmit second configuration information, or the terminal device transmits second configuration information to the base station. The second configuration information is used to indicate the quantity of quantized bits of the phases and the quantity of quantized bits of the amplitudes of each of the s first linear combination coefficient groups (or the $W_3$ codebook).

Optionally, the second configuration information may be further used to configure both a feedback frequency domain granularity and a quantity of quantized bits of first linear combination coefficients, or configure only one of them. The second configuration information may be further used to configure a feedback frequency domain granularity and/or a quantity of quantized bits of first linear combination coefficients in different groups in the s first linear combination coefficient groups separately. Optionally, configuration information of the feedback frequency domain granularity and configuration information of the quantity of quantized bits of the first linear combination coefficients may also be different. For example, the feedback frequency domain granularity of the first linear combination coefficients is configured by the fifth configuration information, and the quantity of quantized bits is configured by sixth configuration information. Flexible configurations of the feedback frequency domain granularity and/or the quantity of quantized bits of the first linear combination coefficients can achieve a compromise between improving feedback precision of channel state information and reducing overheads, and improve feedback precision of channel state information under a specific overhead requirement.

Optionally, the s first linear combination coefficient groups (or the $W_3$ codebook) may be fed back in a long term manner, or fed back in a short term manner.

Optionally, the base vector information ($W_1$ codebook) is fed back in a wideband manner or fed back in a long-term manner.

Optionally, a feedback frequency domain granularity of a phase and a feedback frequency domain granularity of an amplitude of each second linear combination coefficient (or a $W_2$ codebook) and/or a quantity of quantized bits of the phase and a quantity of quantized bits of the amplitude of each second linear combination coefficient may be predefined. Alternatively, the terminal device receives third configuration information, or the terminal device transmits third configuration information to the base station, where the third configuration information is used to configure at least one of a frequency domain granularity of a phase and a frequency domain granularity of an amplitude of each second linear combination coefficient, and a quantity of quantized bits of the phase and a quantity of quantized bits of the amplitude of each second linear combination coefficient. Configuration information of the frequency domain granularity and configuration information of the quantity of quantized bits of each second linear combination coefficient may also be different. This is similar to the method for configuring the s first linear combination coefficient groups, and is not described again herein. Flexible configurations of the feedback frequency domain granularity or the quantity of quantized bits of each second linear combination coefficient can achieve a compromise between improving feedback precision of channel state information and reducing overheads, and improve feedback precision of channel state information under a specific overhead requirement.

Optionally, a feedback frequency domain granularity of amplitudes and a feedback frequency domain granularity of phases and/or a quantity of quantized bits of the amplitudes and a quantity of quantized bits of the phases of each of the s first linear combination coefficient groups are different from those of each of the s second linear combination coefficients. For example, the feedback frequency domain granularity of the amplitudes and/or the feedback frequency domain granularity of the phases of each of the s first linear combination coefficient groups may be predefined (or configured) to be greater than those of each second linear combination coefficient, or the quantity of quantized bits of the amplitudes and/or the quantity of quantized bits of the phases of each of the s first linear combination coefficient groups may be predefined (or configured) to be greater than those of each second linear combination coefficient. For example, a quantity of quantized bits of a phase of each first linear combination coefficient may be predefined to be 3, and a quantity of quantized bits of a phase of each second linear combination coefficient may be predefined to be 2. Alternatively, a quantity of quantized bits of an amplitude of each first linear combination coefficient and/or a quantity of quantized bits of a phase of each first linear combination coefficient may be predefined to be less than that of each second linear combination coefficient. Certainly, this does not exclude that the quantities of quantized bits thereof are the same. Under a same reporting overhead condition, allocating different quantities of quantized bits and/or feedback frequency domain granularities to each first linear combination coefficient and each second linear combination coefficient can improve feedback precision of channel state information and enhance subsequent data transmission performance. For example, if precision of the s first linear combination coefficient groups is more important for improving feedback precision of the channel state information, more bits may be predefined or configured to characterize each first linear combination coefficient. Likewise, if precision of each second linear combination coefficient is more important for improving feedback precision of the channel state information, more bits may be predefined or configured to characterize each second linear combination coefficient.

Optionally, the base station may further transmit fourth configuration information to the terminal device, or the terminal device transmits fourth configuration information to the base station. The fourth configuration information is used to indicate a base vector group. In some embodiments, base vectors used by the terminal device to determine RI second linear combination coefficient groups and a base vector indication are selected from the base vector group indicated by the fourth configuration information. Because an appropriate base vector group is configured, feedback overheads of the terminal device can be reduced.

Optionally, if $W_4$ and $W_3$ codebooks are fed back in a long term manner, assuming that a feedback period (in seconds) of $W_x$ is $T_x$, where x=1, 2, 3 or 4, $T_4 \geq T_3 \geq T_1 \geq T_2$. Reporting of the $W_3$ codebook is based on a $W_4$ codebook that is reported last time, reporting of the $W_1$ codebook is based on $W_4$ and $W_3$ codebooks that are reported last time, and reporting of the $W_2$ codebook is based on $W_4$, $W_3$, and $W_1$ codebooks that are reported last time.

The base station determines, based on the first linear combination coefficients, a precoding matrix corresponding to a new port group. The precoding matrix may accurately align transmit power of the base station with a spatial direction in which the terminal device is located, and increase signal received power of the terminal device. Further, the base station may generate a second precoding matrix based on the second linear combination coefficients and the base vector indication, and perform precoding on the new port group by using the second precoding matrix. This further increases a data transmission rate and/or improves transmission reliability of R-layer data streams.

In the foregoing embodiment, R may be a positive integer such as 1 or 2. Optionally, based on a reported $W_4*W_3$ codebook, the terminal device may determine $W_1$ and $W_2$ codebooks in cases of different possible R values, and determine corresponding CQIs. The terminal device may select an R corresponding to a highest CQI, report corresponding $W_1$ and $W_2$ codebooks, and report the corresponding R value and CQI. Optionally, the terminal device may further select, by comparing reference signal received power RSRP or reference signal received quality RSRQ in cases of different possible R values, an R corresponding to highest RSRP or RSRQ, and calculate a CQI in a case of the R. Then the terminal device may report the selected RI and the corresponding CQI. Optionally, the terminal device may further select, by comparing throughputs in cases of different possible R values, an R and a CQI corresponding to a maximum throughput for reporting. The reported R is a rank indicator (Rank Indicator, RI).

Optionally, assuming that a reporting period of R is $T_{RI}$ (in seconds), $T_4 \geq T_3 \geq T_{RI} \geq T_1 \geq T_2$. To be specific, the terminal device determines R based on $W_4$ and $W_3$ codebooks that are reported last time. Based on R, the terminal device determines $W_1$ and $W_2$ codebooks, and finally determines the CQI. Herein other possible value relationships between $T_{RI}$ and $T_4$, $T_3$ are not excluded.

The foregoing describes the communication method according to the embodiments of the present invention. The following describes a base station and a terminal device according to the embodiments of the present invention with reference to FIG. 6 to FIG. 13.

Figure 6:
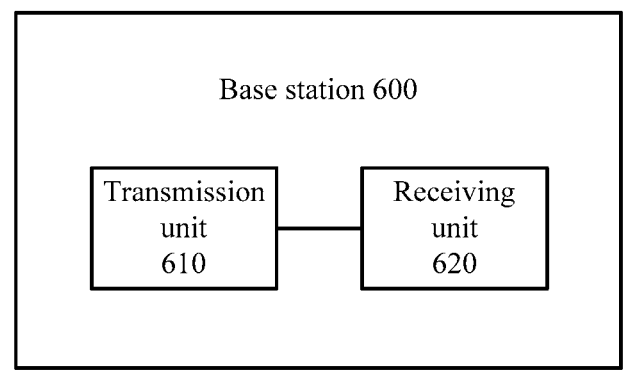
FIG. 6 is a schematic structural diagram of a base station according to an embodiment of the present invention.

FIG. 6 is a schematic structural diagram of a base station 600 according to an embodiment of the present invention. As shown in FIG. 6, the base station 600 includes a transmission unit 610 and a receiving unit 620.

The transmission unit 610 is configured to transmit signals to a terminal device by using n port groups, where each of the n port groups includes at least two ports, and n is a positive integer greater than or equal to 2.

The receiving unit 620 is configured to receive s first linear combination coefficient groups transmitted by the terminal device, where each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups, s is a positive integer less than or equal to n, and s is a positive integer greater than or equal to 2.

In this embodiment of the present invention, the s first linear combination coefficient groups are transmitted to the base station. This can improve channel feedback precision of the terminal device, and further help improve performance of transmission between the base station and the terminal device.

Optionally, the first precoding matrix is obtained based on the s first linear combination coefficient groups and s base vector groups, and each base vector group includes base vectors of one of the s port groups.

In some embodiments, the s first linear combination coefficient groups are used to perform linear combination on the s base vector groups to obtain the first precoding matrix.

Optionally, the receiving unit 620 is further configured to receive base vector information and s second linear combination coefficients transmitted by the terminal device, where the base vector information is used to indicate s base vector groups, each base vector group includes base vectors of one of the s port groups, and at least one base vector group includes at least two base vectors; and the first precoding matrix is obtained through calculation based on the s base vector groups, the s first linear combination coefficient groups, and the s second linear combination coefficients.

In some embodiments, each first linear combination coefficient group is used to perform linear combination on each base vector group to generate a second precoding matrix of each port group, and the s second linear combination coefficients are used to perform linear combination on s second precoding matrices of the s port groups to obtain the first precoding matrix.

Optionally, the transmission unit 610 is further configured to transmit first configuration information to the terminal device before the receiving unit 620 receives the s first linear combination coefficient groups transmitted by the terminal device; or the receiving unit 620 is further configured to receive, before receiving the s first linear combination coefficient groups transmitted by the terminal device, first configuration information transmitted by the terminal device; where the first configuration information is used to indicate at least one of a frequency domain granularity of a phase and a frequency domain granularity of an amplitude of each second linear combination coefficient, and a quantity of quantized bits of the phase and a quantity of quantized bits of the amplitude of each second linear combination coefficient.

Optionally, the transmission unit 610 is further configured to transmit second configuration information of each of the n port groups to the terminal device before the receiving unit 620 receives the s first linear combination coefficient groups transmitted by the terminal device; or the receiving unit 620 is further configured to receive, before receiving the s first linear combination coefficient groups transmitted by the terminal device, second configuration information of each of the n port groups, transmitted by the terminal device; where the second configuration information is used to indicate a base vector group of each port group, and second configuration information of at least two of the n port groups is different.

Optionally, the transmission unit 610 is further configured to transmit third configuration information to the terminal device before the receiving unit 620 receives the s first linear combination coefficient groups transmitted by the terminal device; or the receiving unit 620 is further configured to receive, before receiving the s first linear combination coefficient groups transmitted by the terminal device, third configuration information transmitted by the terminal device; where the third configuration information is used to indicate a quantity s of port groups selected by the terminal device from the n port groups.

Optionally, the transmission unit 610 is further configured to transmit fourth configuration information of each of the n port groups to the terminal device before the receiving unit 620 receives the s first linear combination coefficient groups transmitted by the terminal device; or the receiving unit 620 is further configured to receive, before receiving the s first linear combination coefficient groups transmitted by the terminal device, fourth configuration information of each of the n port groups, transmitted by the terminal device; where the fourth configuration information is used to indicate at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group, and fourth configuration information of at least two of the n port groups is different.

Optionally, the transmission unit 610 is further configured to transmit grouping information of the n port groups to the terminal device before the receiving unit 620 receives the s first linear combination coefficient groups transmitted by the terminal device.

It should be understood that, the base station 600 according to this embodiment of the present invention may correspond to the base station in the communication method 100 according to the embodiment of the present invention, and the foregoing and other operations and/or functions of each unit in the base station 600 are intended to implement the corresponding procedure of the method 100 in FIG. 1. For brevity, details are not described again herein.

It should be noted that, the transmission unit 610 may be implemented by a transmitter, and the receiving unit 620 may be implemented by a receiver.

Figure 7:
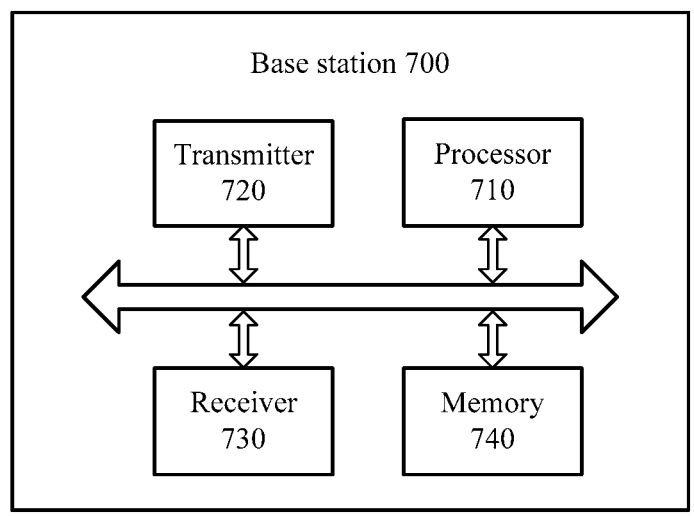
FIG. 7 is a schematic structural diagram of a base station according to another embodiment of the present invention.

FIG. 7 is a schematic structural diagram of a base station 700 according to another embodiment of the present invention. As shown in FIG. 7, the base station 700 includes a processor 710, a transmitter 720, a receiver 730, and a memory 740, where the processor 710, the transmitter 720, the receiver 730, and the memory 740 mutually communicate by using an internal connection channel, and transfer a control signal and/or a data signal. The memory 740 is configured to store an instruction, and the processor 710 is configured to execute the instruction stored in the memory 740.

The transmitter 720 and the receiver 730 are configured to transmit a signal and receive a signal under control of the processor 710.

It should be understood that, the base station 700 according to this embodiment of the present invention may correspond to the base station in the communication method 100 according to the embodiment of the present invention and the base station 600 according to the embodiment of the present invention, and the foregoing and other operations and/or functions of each unit in the base station 700 are intended to implement the corresponding procedure of the method 100 in FIG. 1. For brevity, details are not described again herein.

Figure 8:
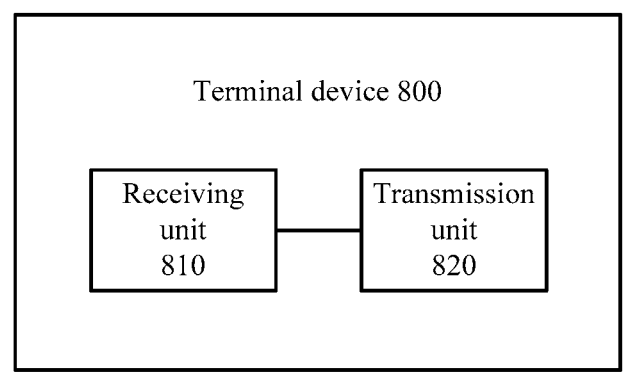
FIG. 8 is a schematic structural diagram of a terminal device according to an embodiment of the present invention.

FIG. 8 is a schematic structural diagram of a terminal device 800 according to an embodiment of the present invention. As shown in FIG. 8, the terminal device 800 includes a receiving unit 810 and a transmission unit 820.

The receiving unit 810 is configured to receive signals transmitted by a base station by using n port groups, where each of the n port groups includes at least two ports, and n is a positive integer greater than or equal to 2.

The transmission unit 820 is configured to transmit s first linear combination coefficient groups to the base station, where each first linear combination coefficient group includes first linear combination coefficients of one of s port groups, at least one first linear combination coefficient group includes at least two non-zero coefficients, the s first linear combination coefficient groups are used to determine a first precoding matrix, the s port groups are included in the n port groups, s is a positive integer less than or equal to n, and s is a positive integer greater than or equal to 2.

In this embodiment of the present invention, the s first linear combination coefficient groups are transmitted to the base station. This can improve channel feedback precision of the terminal device, and further help improve performance of transmission between the base station and the terminal device.

Optionally, the first precoding matrix is obtained based on the s first linear combination coefficient groups and s base vector groups, and each base vector group includes base vectors of one of the s port groups.

In some embodiments, the s first linear combination coefficient groups are used to perform linear combination on the s base vector groups to obtain the first precoding matrix.

Optionally, the transmission unit 820 is further configured to transmit base vector information and s second linear combination coefficients to the base station, where the base vector information is used to indicate s base vector groups, each base vector group includes base vectors of one of the s port groups, and at least one base vector group includes at least two base vectors; and the first precoding matrix is obtained through calculation based on the s base vector groups, the s first linear combination coefficient groups, and the s second linear combination coefficients.

In some embodiments, each first linear combination coefficient group is used to perform linear combination on each base vector group to generate a second precoding matrix of each port group, and the s second linear combination coefficients are used to perform linear combination on s precoding matrices of the s port groups to obtain the first precoding matrix.

Optionally, the receiving unit 810 is further configured to receive, before the transmission unit 820 transmits the s first linear combination coefficient groups to the base station, first configuration information transmitted by the base station; or the transmission unit is further configured to transmit first configuration information to the base station before transmitting the s first linear combination coefficient groups to the base station; where the first configuration information is used to indicate at least one of a frequency domain granularity of a phase and a frequency domain granularity of an amplitude of each second linear combination coefficient, and a quantity of quantized bits of the phase and a quantity of quantized bits of the amplitude of each second linear combination coefficient.

Optionally, the receiving unit 810 is further configured to receive, before the transmission unit 820 transmits the s first linear combination coefficient groups to the base station, second configuration information corresponding to each of the n port groups, transmitted by the base station; or the transmission unit is further configured to transmit second configuration information corresponding to each of the n port groups to the base station before transmitting the s first linear combination coefficient groups to the base station; where the second configuration information is used to indicate a base vector group corresponding to each port group, and second configuration information corresponding to at least two of the n port groups is different.

Optionally, the receiving unit 810 is further configured to receive, before the transmission unit 820 transmits the s first linear combination coefficient groups to the base station, third configuration information transmitted by the base station; or the transmission unit 820 is further configured to transmit third configuration information to the base station before transmitting the s first linear combination coefficient groups to the base station; where the third configuration information is used to indicate a quantity s of port groups selected by the terminal device from the n port groups.

Optionally, the receiving unit 810 is further configured to receive, before the transmission unit 820 transmits the s first linear combination coefficient groups to the base station, fourth configuration information of each of the n port groups, transmitted by the base station; or the transmission unit 820 is further configured to transmit fourth configuration information of each of the n port groups to the base station before transmitting the s first linear combination coefficient groups to the base station; where the fourth configuration information is used to indicate at least one of a frequency domain granularity of phases and a frequency domain granularity of amplitudes of the first linear combination coefficients of each port group, and a quantity of quantized bits of the phases and a quantity of quantized bits of the amplitudes of the first linear combination coefficients of each port group, and fourth configuration information of at least two of the n port groups is different.

Optionally, the receiving unit 810 is further configured to receive, before the transmission unit 820 transmits the s first linear combination coefficient groups to the base station, grouping information of the n port groups that is transmitted by the base station.

It should be understood that, the terminal device 800 according to this embodiment of the present invention may correspond to the terminal device in the communication method 100 according to the embodiment of the present invention, and the foregoing and other operations and/or functions of each unit in the terminal device 800 are intended to implement the corresponding procedure of the method 100 in FIG. 1. For brevity, details are not described again herein.

It should be noted that, the receiving unit 810 may be implemented by a receiver, and the transmission unit 820 may be implemented by a transmitter.

Figure 9:
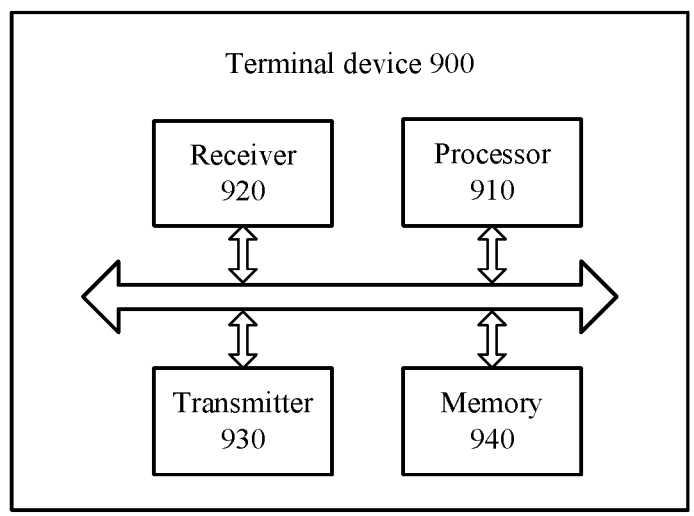
FIG. 9 is a schematic structural diagram of a terminal device according to another embodiment of the present invention.

FIG. 9 is a schematic structural diagram of a terminal device 900 according to another embodiment of the present invention. As shown in FIG. 9, the terminal device 900 includes a processor 910, a receiver 920, a transmitter 930, and a memory 940, where the processor 910, the receiver 920, the transmitter 930, and the memory 940 mutually communicate by using an internal connection channel, and transfer a control signal and/or a data signal. The memory 940 is configured to store an instruction, and the processor 910 is configured to execute the instruction stored in the memory 940.

The receiver 920 and the transmitter 930 are configured to receive a signal and transmit a signal under control of the processor 910.

It should be understood that, the terminal device 900 according to this embodiment of the present invention may correspond to the terminal device in the communication method 100 according to the embodiment of the present invention and the terminal device 800 according to the embodiment of the present invention, and the foregoing and other operations and/or functions of each unit in the terminal device 900 are intended to implement the corresponding procedure of the method 100 in FIG. 1. For brevity, details are not described again herein.

Figure 10:
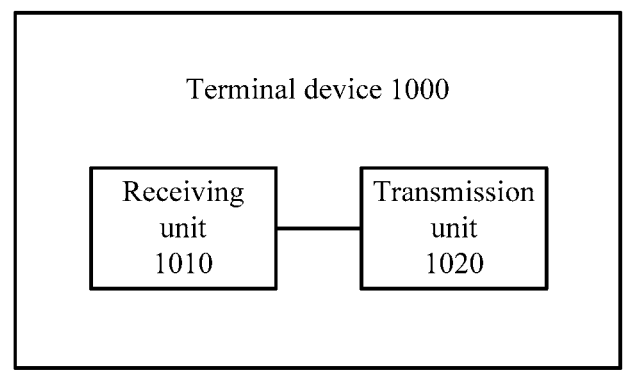
FIG. 10 is a schematic structural diagram of a terminal device according to another embodiment of the present invention.

FIG. 10 is a schematic structural diagram of a terminal device 1000 according to an embodiment of the present invention. As shown in FIG. 10, the terminal device 1000 includes a receiving unit 1010 and a transmission unit 1020.

The receiving unit 1010 is configured to receive reference signals of n port groups, where each of the n port groups includes p ports, n is a positive integer greater than or equal to 2, and p is a positive integer greater than or equal to 1.

The transmission unit 1020 is configured to transmit s first linear combination coefficient groups, base vector information, and second linear combination coefficients, where the s first linear combination coefficient groups, the base vector information, and the second linear combination coefficients are determined based on measurement results of the reference signals of the n port groups, where the s first linear combination coefficient groups are first linear combination coefficients of s port groups selected from the n port groups, and are used to perform linear combination on the s port groups, where an $x_1^{th}$ port in a first port group is linearly combined with an $x_2^{th}$ port in a second port group to an $x_s^{th}$ port in an $s^{th}$ port group in the s port groups, $1 \leq x_w \leq p$, $1 \leq w \leq s$, $2 \leq s \leq n$, and $x_w$, w, and s are integers; and the base vector information and the second linear combination coefficients are determined based on the s first linear combination coefficient groups, the base vector information is used to indicate at least two base vectors, the second linear combination coefficients are used to perform linear combination on the at least two base vectors, and the s first linear combination coefficient groups, the at least two base vectors, and the second linear combination coefficients are used to determine a precoding matrix.

In this embodiment of the present invention, the s first linear combination coefficient groups, the base vector information, and the second linear combination coefficients are transmitted to a base station. This can improve channel feedback precision of the terminal device, and further help improve performance of transmission between the base station and the terminal device.

The $x_1^{th}$ port in the first port group, and the $x_2^{th}$ port in the second port group to the $x_s^{th}$ port in the $s^{th}$ port group in the s port groups correspond to a same antenna.

Optionally, the transmission unit 1020 is further configured to transmit a channel quality indicator CQI, where the CQI is determined based on identifiers of ports in the s groups and a matrix W, and the matrix W satisfies the following expression:

$$W=W_3*W_1*W_2,$$

where $W_3$ is a matrix including the s first linear combination coefficient groups, $W_1$ is a matrix including the at least two base vectors, and $W_2$ is a matrix including the second linear combination coefficients.

Optionally, the transmission unit 1020 is further configured to transmit a CQI, where the CQI is determined based on a matrix W, and the matrix W satisfies the following expression:

$$W=W_4*W_3*W_1*W_2,$$

where $W_4$ is a matrix used to represent identifiers of ports in the s groups, $W_3$ is a matrix including the s first linear combination coefficient groups, $W_1$ is a matrix including the at least two base vectors, and $W_2$ is a matrix including the second linear combination coefficients.

Optionally, the transmission unit 1020 is further configured to transmit indication information, where the indication information includes the identifiers of the ports in the s groups.

Optionally, a feedback frequency domain granularity and/or a quantity of quantized bits of each of the s first linear combination coefficient groups are/is different from a feedback frequency domain granularity and/or a quantity of quantized bits of each second linear combination coefficient, and the feedback frequency domain granularity includes at least one of a wideband feedback, a subband feedback, and a partial bandwidth feedback.

Optionally, the feedback frequency domain granularity of each of the s first linear combination coefficient groups is the wideband feedback, and the feedback frequency domain granularity of each second linear combination coefficient is the subband feedback or the partial bandwidth feedback.

Optionally, a quantity of quantized bits of amplitudes of each of the s first linear combination coefficient groups is greater than or equal to a quantity of quantized bits of an amplitude of each second linear combination coefficient; and/or a quantity of quantized bits of phases of each of the s first linear combination coefficient groups is greater than or equal to a quantity of quantized bits of a phase of each second linear combination coefficient.

Optionally, the receiving unit 1010 is further configured to receive first configuration information before the transmission unit 1020 transmits the s first linear combination coefficient groups; or the transmission unit 1020 is further configured to transmit first configuration information before transmitting the s first linear combination coefficient groups; where the first configuration information is used to indicate a value of s or a maximum value of s.

Optionally, the receiving unit 1010 is further configured to receive second configuration information before the transmission unit 1020 transmits the s first linear combination coefficient groups; or the transmission unit 1020 is further configured to transmit second configuration information before transmitting the s first linear combination coefficient groups; where the second configuration information is used to configure at least one of a feedback frequency domain granularity of phases and a feedback frequency domain granularity of amplitudes of the first linear combination coefficients of each port group, and a quantity of quantized bits of the phases and a quantity of quantized bits of the amplitudes of the first linear combination coefficients of each port group.

Optionally, the receiving unit 1010 is further configured to receive third configuration information before the transmission unit 1020 transmits the second linear combination coefficients; or the transmission unit 1020 is further configured to transmit third configuration information before transmitting the second linear combination coefficients to the base station; where the third configuration information is used to configure at least one of a frequency domain granularity of the phase and a frequency domain granularity of the amplitude of each second linear combination coefficient, and the quantity of quantized bits of the phase and the quantity of quantized bits of the amplitude of each second linear combination coefficient.

Optionally, the receiving unit 1010 is further configured to receive, before the transmission unit 1020 transmits the s first linear combination coefficient groups, grouping information of the n port groups that is transmitted by the base station.

It should be understood that, the terminal device 1000 according to this embodiment of the present invention may correspond to the terminal device in the communication method 200 according to the embodiment of the present invention, and the foregoing and other operations and/or functions of each unit in the terminal device 1000 are intended to implement the corresponding procedure of the method 200 in FIG. 2. For brevity, details are not described again herein.

It should be noted that, the receiving unit 1010 may be implemented by a receiver, and the transmission unit 1020 may be implemented by a transmitter.

Figure 11:
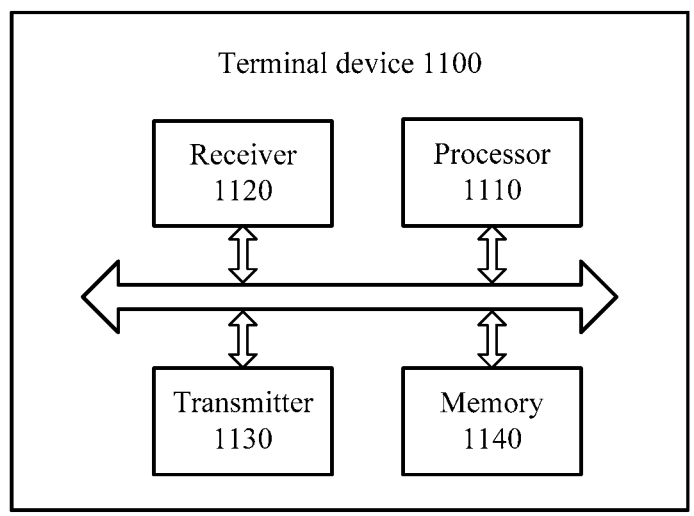
FIG. 11 is a schematic structural diagram of a terminal device according to another embodiment of the present invention.

FIG. 11 is a schematic structural diagram of a terminal device 1100 according to another embodiment of the present invention. As shown in FIG. 11, the terminal device 1100 includes a processor 1110, a transmitter 1120, a receiver 1130, and a memory 1140, where the processor 1110, the transmitter 1120, the receiver 1130, and the memory 1140 mutually communicate by using an internal connection channel, and transfer a control signal and/or a data signal. The memory 1140 is configured to store an instruction, and the processor 1110 is configured to execute the instruction stored in the memory 1140.

The transmitter 1120 and the receiver 1130 are configured to transmit a signal and receive a signal under control of the processor 1110.

It should be understood that, the terminal device 1100 according to this embodiment of the present invention may correspond to the terminal device in the communication method 200 according to the embodiment of the present invention and the terminal device 1000 according to the embodiment of the present invention, and the foregoing and other operations and/or functions of each unit in the terminal device 1100 are intended to implement the corresponding procedure of the method 200 in FIG. 2. For brevity, details are not described again herein.

Figure 12:
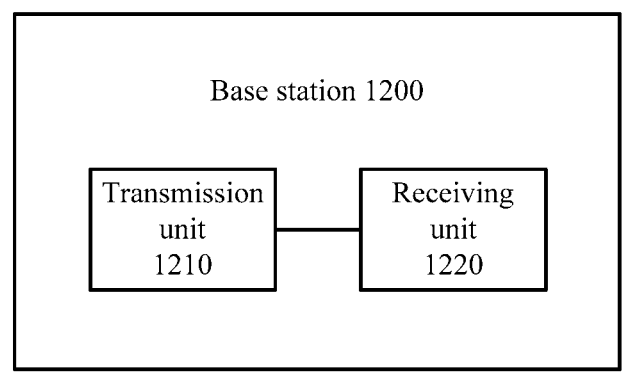
FIG. 12 is a schematic structural diagram of a base station according to another embodiment of the present invention.

FIG. 12 is a schematic structural diagram of a base station 1200 according to an embodiment of the present invention. As shown in FIG. 12, the base station 1200 includes a transmission unit 1210 and a receiving unit 1220.

The transmission unit 1210 is configured to transmit reference signals by using n port groups, where each of the n port groups includes p ports, n is a positive integer greater than or equal to 2, and p is a positive integer greater than or equal to 1.

The receiving unit 1220 is configured to receive s first linear combination coefficient groups, base vector information, and second linear combination coefficients, where the s first linear combination coefficient groups are first linear combination coefficients of s port groups selected by a terminal device from the n port groups, and are used to perform linear combination on the s port groups, where an $x_1^{th}$ port in a first port group is linearly combined with an $x_2^{th}$ port in a second port group to an $x_s^{th}$ port in an $s^{th}$ port group in the s port groups, $1 \le x_w \le p$, $1 \le w \le s$, $2 \le s \le n$, and $x_w$, w, and s are integers; and the base vector information and the second linear combination coefficients are determined based on the s first linear combination coefficient groups, the base vector information is used to indicate at least two base vectors, the second linear combination coefficients are used to perform linear combination on the at least two base vectors, and the s first linear combination coefficient groups, the at least two base vectors, and the second linear combination coefficients are used to determine a precoding matrix.

In this embodiment of the present invention, the s first linear combination coefficient groups, the base vector information, and the second linear combination coefficients are transmitted to the base station. This can improve channel feedback precision of the terminal device, and further help improve performance of transmission between the base station and the terminal device.

Optionally, the $x_1^{th}$ port in the first port group, and the $x_2^{th}$ port in the second port group to the $x_s^{th}$ port in the $s^{th}$ port group in the s port groups correspond to a same antenna.

Optionally, the receiving unit 1220 is further configured to receive a channel quality indicator CQI, where the CQI is determined based on identifiers of ports in the s groups, the s first linear combination coefficient groups, the base vector information, and the second linear combination coefficients.

Optionally, the receiving unit 1220 is further configured to receive indication information, where the indication information includes the identifiers of the ports in the s groups.

Optionally, a feedback frequency domain granularity and/or a quantity of quantized bits of each of the s first linear combination coefficient groups are/is different from a feedback frequency domain granularity and/or a quantity of quantized bits of each second linear combination coefficient, and the feedback frequency domain granularity includes at least one of a wideband feedback, a subband feedback, and a partial bandwidth feedback.

Optionally, the feedback frequency domain granularity of each of the s first linear combination coefficient groups is the wideband feedback, and the feedback frequency domain granularity of each second linear combination coefficient is the subband feedback or the partial bandwidth feedback.

Optionally, a quantity of quantized bits of amplitudes of each of the s first linear combination coefficient groups is greater than or equal to a quantity of quantized bits of an amplitude of each second linear combination coefficient; and/or a quantity of quantized bits of phases of each of the s first linear combination coefficient groups is greater than or equal to a quantity of quantized bits of a phase of each second linear combination coefficient.

Optionally, the transmission unit 1210 is further configured to transmit first configuration information before the receiving unit 1220 receives the s first linear combination coefficient groups; or the receiving unit 1220 is further configured to receive first configuration information before receiving the s first linear combination coefficient groups; where the first configuration information is used to indicate a value of s or a maximum value of s.

Optionally, the transmission unit 1210 is further configured to transmit second configuration information before the receiving unit 1220 receives the s first linear combination coefficient groups; or the receiving unit 1220 is further configured to receive second configuration information before receiving the s first linear combination coefficient groups; where the second configuration information is used to configure at least one of a feedback frequency domain granularity of phases and a feedback frequency domain granularity of amplitudes of the first linear combination coefficients of each port group, and a quantity of quantized bits of the phases and a quantity of quantized bits of the amplitudes of the first linear combination coefficients of each port group.

Optionally, the transmission unit 1210 is further configured to transmit third configuration information before the receiving unit 1220 receives the second linear combination coefficients; or the receiving unit 1220 is further configured to receive third configuration information before receiving the second linear combination coefficients; where the third configuration information is used to configure at least one of a frequency domain granularity of the phase and a frequency domain granularity of the amplitude of each second linear combination coefficient, and the quantity of quantized bits of the phase and the quantity of quantized bits of the amplitude of each second linear combination coefficient.

Optionally, the transmission unit 1210 is further configured to transmit grouping information of the n port groups before the receiving unit 1220 receives the s first linear combination coefficient groups.

It should be understood that, the base station 1200 according to this embodiment of the present invention may correspond to the base station in the communication method 200 according to the embodiment of the present invention, and the foregoing and other operations and/or functions of each unit in the base station 1200 are intended to implement the corresponding procedure of the method 200 in FIG. 2. For brevity, details are not described again herein.

It should be noted that, the transmission unit 1210 may be implemented by a transmitter, and the receiving unit 1220 may be implemented by a receiver.

Figure 13:
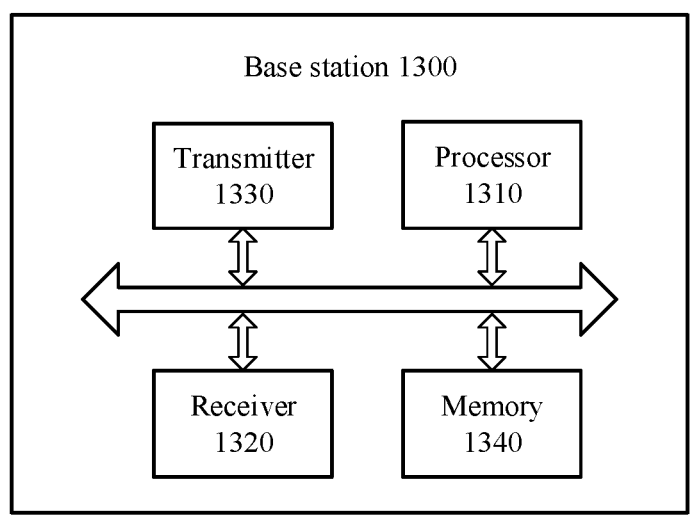
FIG. 13 is a schematic structural diagram of a base station according to another embodiment of the present invention.

FIG. 13 is a schematic structural diagram of a base station 1300 according to another embodiment of the present invention. As shown in FIG. 13, the base station 1300 includes a processor 1310, a receiver 1320, a transmitter 1330, and a memory 1340, where the processor 1310, the receiver 1320, the transmitter 1330, and the memory 1340 mutually communicate by using an internal connection channel, and transfer a control signal and/or a data signal. The memory 1340 is configured to store an instruction, and the processor 1310 is configured to execute the instruction stored in the memory 1340.

The receiver 1320 and the transmitter 1330 are configured to receive a signal and transmit a signal under control of the processor 1310.

It should be understood that, the base station 1300 according to this embodiment of the present invention may correspond to the base station in the communication method 200 according to the embodiment of the present invention and the base station 1200 according to the embodiment of the present invention, and the foregoing and other operations and/or functions of each unit in the base station 1300 are intended to implement the corresponding procedure of the method 200 in FIG. 2. For brevity, details are not described again herein.

The memory in the foregoing embodiments may include a volatile memory (volatile memory), for example, a random access memory (random-access memory, RAM). The memory may also include a non-volatile memory (non-volatile memory), for example, a flash memory (flash memory), a hard disk drive (hard disk drive, HDD), or a solid-state drive (solid-state drive, SSD). The memory may further include a combination of the foregoing types of memories.

The processor in the foregoing embodiments may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    transmitting, by a base station, signals to a terminal device using n port groups, wherein each of the n port groups comprises at least two ports, and n is a positive integer greater than or equal to 2;
    transmitting, by the base station, configuration information of each of then port groups to the terminal device; or receiving, by the base station, configuration information of each of the n port groups, from the terminal device;
    wherein the configuration information indicates at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group; and
    receiving, by the base station, s first linear combination coefficient groups from the terminal device, wherein each first linear combination coefficient group comprises first linear combination coefficients of one of s port groups, at least one first linear combination coefficient group comprises at least two non-zero coefficients, the s first linear combination coefficient groups are used to determine a first precoding matrix, the s port groups are comprised in the n port groups, s is a positive integer less than or equal to n, and s is a positive integer greater than or equal to 2.

2. The method according to claim 1, wherein
    the first precoding matrix is obtained based on the s first linear combination coefficient groups and s base vector groups, and each base vector group comprises base vectors of one of the s port groups.

3. The method according to claim 1, wherein before the receiving, by the base station, s first linear combination coefficient groups from the terminal device, the method further comprises:
transmitting, by the base station, further configuration information to the terminal device; or
receiving, by the base station, further configuration information transmitted by the terminal device; wherein
the further configuration information indicates a quantity of ports selected by the terminal device from each port group.

4. A communication method, comprising:
receiving, by a terminal device, signals from a base station using n port groups, wherein each of the n port groups comprises at least two ports, and n is a positive integer greater than or equal to 2;
receiving, by the terminal device, configuration information of each of the n port groups from the base station; or transmitting, by the terminal device, configuration information of each of the n port groups, to the base station;
wherein the configuration information indicates at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group; and
transmitting, by the terminal device, s first linear combination coefficient groups to the base station, wherein each first linear combination coefficient group comprises first linear combination coefficients of one of s port groups, at least one first linear combination coefficient group comprises at least two non-zero coefficients, the s first linear combination coefficient groups are used to determine a first precoding matrix, the s port groups are comprised in the n port groups, s is a positive integer less than or equal to n, and s is a positive integer greater than or equal to 2.

5. The method according to claim 4, wherein
the first precoding matrix is obtained based on the s first linear combination coefficient groups and s base vector groups, and each base vector group comprises base vectors of one of the s port groups.

6. The method according to claim 4, wherein before the transmitting, by the terminal device, s first linear combination coefficient groups to the base station, the method further comprises:
receiving, by the terminal device, further configuration information from the base station; or
transmitting, by the terminal device, further configuration information to the base station; wherein
the further configuration information indicates a quantity of ports selected by the terminal device from each port group.

7. An apparatus, comprising:
one or more processors, and
a computer-readable storage medium storing program instructions; wherein, when executed by the one or more processors, the instructions cause the apparatus to:
transmit signals to a terminal device using n port groups, wherein each of the n port groups comprises at least two ports, and n is a positive integer greater than or equal to 2;

transmit, to the terminal device, configuration information of each of then port groups; or receive, from the terminal device, configuration information of each of the n port groups;
wherein the configuration information indicates at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group; and
receive s first linear combination coefficient groups from the terminal device, wherein each first linear combination coefficient group comprises first linear combination coefficients of one of s port groups, at least one first linear combination coefficient group comprises at least two non-zero coefficients, the s first linear combination coefficient groups are used to determine a first precoding matrix, the s port groups are comprised in the n port groups, s is a positive integer less than or equal to n, and s is a positive integer greater than or equal to 2.

8. The apparatus according to claim 7, wherein:
the first precoding matrix is obtained based on the s first linear combination coefficient groups and s base vector groups, and each base vector group comprises base vectors of one of the s port groups.

9. The apparatus according to claim 7, wherein before receiving s first linear combination coefficient groups from the terminal device, the instructions further cause the apparatus to:
transmit further configuration information to the terminal device; or
receive further configuration information transmitted by the terminal device; wherein
the further configuration information indicates a quantity of ports selected by the terminal device from each port group.

10. An apparatus, comprising:
one or more processors, and
a computer-readable storage medium storing program instructions; wherein, when executed by the one or more processors, the instructions cause the apparatus to:
receive signals from a base station using n port groups, wherein each of the n port groups comprises at least two ports, and n is a positive integer greater than or equal to 2;
receive, from the base station, configuration information of each of the n port groups; or transmit, to the base station, configuration information of each of the n port groups,
wherein the configuration information indicates at least one of a frequency domain granularity of phases and a frequency domain granularity of amplitudes of first linear combination coefficients of each port group, and a quantity of quantized bits of the phases and a quantity of quantized bits of the amplitudes of the first linear combination coefficients of each port group; and
transmit s first linear combination coefficient groups to the base station, wherein each first linear combination coefficient group comprises first linear combination coefficients of one of s port groups, at least one first linear combination coefficient group comprises at least two non-zero coefficients, the s first linear combination coefficient groups are used to determine a first precoding matrix, the s port groups are comprised in the n port groups, s is a positive integer less than or equal to n, and s is a positive integer greater than or equal to 2.

11. The apparatus according to claim 10, wherein:
the first precoding matrix is obtained based on the s first linear combination coefficient groups and s base vector groups, and each base vector group comprises base vectors of one of the s port groups.

12. The apparatus according to claim 10, wherein before transmitting s first linear combination coefficient groups to the base station, the instructions further cause the apparatus to:
receive further configuration information from the base station; or
transmit further configuration information to the base station; wherein
the further configuration information indicates a quantity of ports selected by the apparatus from each port group.

\* \* \* \* \*

UNITED STATES PATENT AND TRADEMARK OFFICE
CERTIFICATE OF CORRECTION

PATENT NO. : 10,855,357 B2  
APPLICATION NO. : 16/460662  
DATED : December 1, 2020  
INVENTOR(S) : Xueru Li, Kunpeng Liu and Bingyu Qu Page 1 of 1

It is certified that error appears in the above-identified patent and that said Letters Patent is hereby corrected as shown below:

In the Specification

In Column 1, Line 12, delete "2017," and insert -- 2017. --, therefor.

In the Claims

In Column 58, Line 41, in Claim 1, delete "then" and insert -- the n --, therefor.

In Column 60, Line 2, in Claim 7, delete "then" and insert -- the n --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*